(12) United States Patent
De Smet

(10) Patent No.: US 10,871,950 B2
(45) Date of Patent: Dec. 22, 2020

(54) PERSISTENT ANNOTATION OF SYNTAX GRAPHS FOR CODE OPTIMIZATION

(71) Applicant: Microsoft Technology Licensing, LLC, Redmond, WA (US)

(72) Inventor: Bart J. F. De Smet, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/414,526

(22) Filed: May 16, 2019

(65) Prior Publication Data
US 2020/0364036 A1 Nov. 19, 2020

(51) Int. Cl.
*G06F 8/41* (2018.01)
*G06F 16/901* (2019.01)

(52) U.S. Cl.
CPC .............. *G06F 8/443* (2013.01); *G06F 8/427* (2013.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 5,752,038 A * | 5/1998 | Blake | ...................... | G06F 9/445 714/E11.195 |
| 6,745,384 B1* | 6/2004 | Biggerstaff | ........... | G06F 8/4441 712/203 |
| 6,804,682 B1* | 10/2004 | Kemper | ..................... | G06F 8/72 |
| 7,370,318 B1* | 5/2008 | Howe | ................... | G06F 8/4441 717/110 |
| 2004/0250237 A1* | 12/2004 | Simonyi | ................... | G06F 8/33 717/105 |

(Continued)

OTHER PUBLICATIONS

"Abstract syntax tree", retrieved from «https://en.wikipedia.org/wiki/Abstract_syntax_tree», 5 pages, Apr. 8, 2019.

(Continued)

*Primary Examiner* — Philip Wang
(74) *Attorney, Agent, or Firm* — Ogilvie Law Firm

(57) ABSTRACT

Optimization opportunities are located and documented to enhance code translation by compilers or interpreters. An enhanced translator scans a program syntax graph, recognizes subgraph structures, and annotates nodes of the graph to document optimization characteristics of program code entities associated with the nodes. Subgraph structures and corresponding annotations may be maintained in an optimization catalog, distinct from any particular optimizable program. Optimizers improve program code translation based on the annotated syntax graph. Optimization characteristics may specify code purity in terms of execution value ranges and execution behaviors, e.g., side-effects, local or global variable usage, I/O, by-reference parameters, and which exceptions are possible. Subgraph structures may be identified using routine names, hash values, and templates with holes any constant will fill. Parent node characteristics may be inferred from characteristics of child nodes. Optimization candidates may be prioritized using weight functions. Optimizer callbacks may be inserted to evaluate optimization characteristics incrementally.

20 Claims, 7 Drawing Sheets

---

ENHANCED TRANSLATOR 102, 206

MEMORY/MEDIA 112

OPTIMIZATION CHARACTERISTIC 402 ANNOTATION 404, GRAPH ANNOTATOR 406, CORRESPONDING CODE 408

SYNTAX GRAPH 410 TRAVERSER 412, SYNTAX GRAPH NODES 414 AND CONNECTIONS 416

SUBGRAPH STRUCTURE 418 RECOGNIZER 420

INTERFACE 422
REWRITER 426
PLUGGABLE OPTIMIZER 424
CONFIGURED PROCESSOR(S) 110

(56) References Cited

U.S. PATENT DOCUMENTS

| | | | |
|---|---|---|---|
| 2005/0198624 A1* | 9/2005 | Chipman | G06F 8/443 |
| | | | 717/146 |
| 2009/0327925 A1 | 12/2009 | De Smet | |
| 2012/0072411 A1 | 3/2012 | De Smet et al. | |
| 2012/0072442 A1 | 3/2012 | De Smet et al. | |
| 2012/0078878 A1 | 3/2012 | De Smet et al. | |
| 2012/0079464 A1 | 3/2012 | De Smet et al. | |
| 2012/0084749 A1 | 4/2012 | Gogh et al. | |
| 2012/0150913 A1 | 6/2012 | De Smet et al. | |
| 2012/0151187 A1 | 6/2012 | De Smet et al. | |
| 2013/0031536 A1* | 1/2013 | De | G06F 9/4552 |
| | | | 717/146 |
| 2013/0097580 A1 | 4/2013 | Meijer et al. | |
| 2013/0104107 A1 | 4/2013 | De Smet et al. | |
| 2013/0117288 A1 | 5/2013 | De Smet et al. | |
| 2013/0117326 A1 | 5/2013 | De Smet et al. | |
| 2013/0117736 A1 | 5/2013 | De Smet et al. | |
| 2013/0132333 A1 | 5/2013 | De Smet et al. | |
| 2013/0132962 A1 | 5/2013 | De Smet et al. | |
| 2014/0019949 A1* | 1/2014 | Craymer | G06F 8/456 |
| | | | 717/150 |
| 2014/0067871 A1 | 3/2014 | Meek et al. | |
| 2015/0205584 A1 | 7/2015 | De Smet et al. | |
| 2015/0381679 A1 | 12/2015 | De Smet et al. | |
| 2016/0147567 A1 | 5/2016 | Burger et al. | |
| 2016/0299786 A1 | 10/2016 | De Smet et al. | |
| 2016/0299799 A1 | 10/2016 | De Smet | |
| 2016/0306714 A1 | 10/2016 | De Smet et al. | |
| 2016/0350084 A1* | 12/2016 | Waggoner | G06F 8/34 |
| 2017/0004025 A1 | 1/2017 | Dyer et al. | |
| 2017/0099298 A1 | 4/2017 | Yahalom et al. | |
| 2017/0147621 A1 | 5/2017 | De Smet et al. | |
| 2017/0154076 A1 | 6/2017 | De Smet et al. | |
| 2017/0154080 A1 | 6/2017 | De Smet | |
| 2018/0039575 A1 | 2/2018 | De Smet et al. | |

OTHER PUBLICATIONS

"Abstract syntax", retrieved from «https://en.wikipedia.org/wiki/Abstract_syntax», 2 pages, Sep. 2, 2016.

"Callback (computer programming)", retrieved from «https://en.wikipedia.org/wiki/Callback_(computer_programming)», 8 pages, Mar. 15, 2019.

"Compile time function execution", retrieved from «https://en.wikipedia.org/wiki/Compile_time_function_execution», 3 pages, Feb. 7, 2017.

"Constant folding", retrieved from «https://en.wikipedia.org/wiki/Constant_folding», 4 pages, Mar. 20, 2019.

"C++11", retrieved from «https://en.wikipedia.org/wiki/C%2B%2B11#constexpr_%E2%80%93_Generalized_constant_expressions», 39 pages, Mar. 28, 2019.

"Evaluation strategy", retrieved from «https://en.wikipedia.org/wiki/Evaluation_strategy#Call_by_value», 10 pages, Mar. 1, 2019.

"Exception handling", retrieved from «https://en.wikipedia.org/wiki/Exception_handling», 10 pages, Apr. 4, 2019.

"Memoization", retrieved from «https://en.wikipedia.org/wiki/Memoization», 8 pages, Oct. 17, 2018.

"Monad (functional programming)", retrieved from «https://en.wikipedia.org/wiki/Monad_(functional_programming)», 15 pages, Apr. 11, 2019.

"Optimizing compiler", retrieved from «https://en.wikipedia.org/wiki/Optimizing_compiler», 15 pages, Mar. 19, 2019.

"Program optimization", retrieved from «https://en.wikipedia.org/wiki/Program_optimization», 11 pages, Apr. 1, 2019.

"Pure function", retrieved from «https://en.wikipedia.org/wiki/Pure_function», 5 pages, Feb. 15, 2019.

* cited by examiner

PERSISTENT ANNOTATION OF SYNTAX GRAPHS FOR CODE OPTIMIZATION

BACKGROUND

Noon Software development activities often include translating source code to obtain executable code. The translation may be done by a compiler which produces executable code by translating source code in relatively large pieces such as entire files. Or the translation may be done by an interpreter which produces executable code in smaller pieces, e.g., one single programming language statement at a time is translated and then executed. Because many compilers work with larger amounts of source code during a given translation effort than many interpreters, compilers often have more opportunities than interpreters to optimize the executable code that is produced by translation. However, optimization is not limited to translation activity by compilers.

An optimization may reduce the amount of memory used by the executable code, or reduce the amount of time needed to run the executable code, for example. However, whether an optimization is available in practice, not merely in theory, depends on several things. A given translator must correctly recognize that a given optimization is possible in view of particular source code and in view of a particular target processor and target execution environment. Moreover, for the optimization to be available in practice, the translator must be able to generate executable code that embodies the optimization without breaking the program. That is, an optimized version of the executable code of a program should have the same behavior with respect to all program inputs and corresponding outputs as a non-optimized version of the program; altered behavior indicates a broken program. The optimized version does the same thing as the non-optimized version, but does it faster or with less memory, for instance.

As a result of such dependencies, and of other factors such as the complexity of code optimization and a frequent lack of visibility into optimization from a developer's point of view, code optimization is often an ad hoc endeavor in which many opportunities for optimization are missed.

SUMMARY

Some embodiments use or perform operations that find optimization opportunities during code translation. These operations scan at least part of a syntax graph of a program. The syntax graph has nodes, and it represents at syntactic structure aspects of the program. The operations also ascertain that code of the program which is associated with a node of the syntax graph has an optimization characteristic, and they annotate the syntax graph according to the ascertained optimization characteristic. Then an embodiment is able to produce an optimization of the program based at least in part on the annotated syntax graph.

Some embodiments of teachings presented herein include or communicate with code translation optimization functionality that includes digital hardware configured to perform certain operations. These operations may include (a) traversing at least a portion of a syntax graph of a program, (b) recognizing a predetermined subgraph structure in the syntax graph, (c) associating an optimization characteristic annotation with the recognized syntax subgraph structure, the resulting association indicating an extent to which an aspect of a piece of code that corresponds to the recognized subgraph structure is discernable prior to execution of the piece of code, the aspect including an execution value or an execution effect or both, and (d) performing an optimization of a code translation of the program based at least in part on a result of the associating step.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
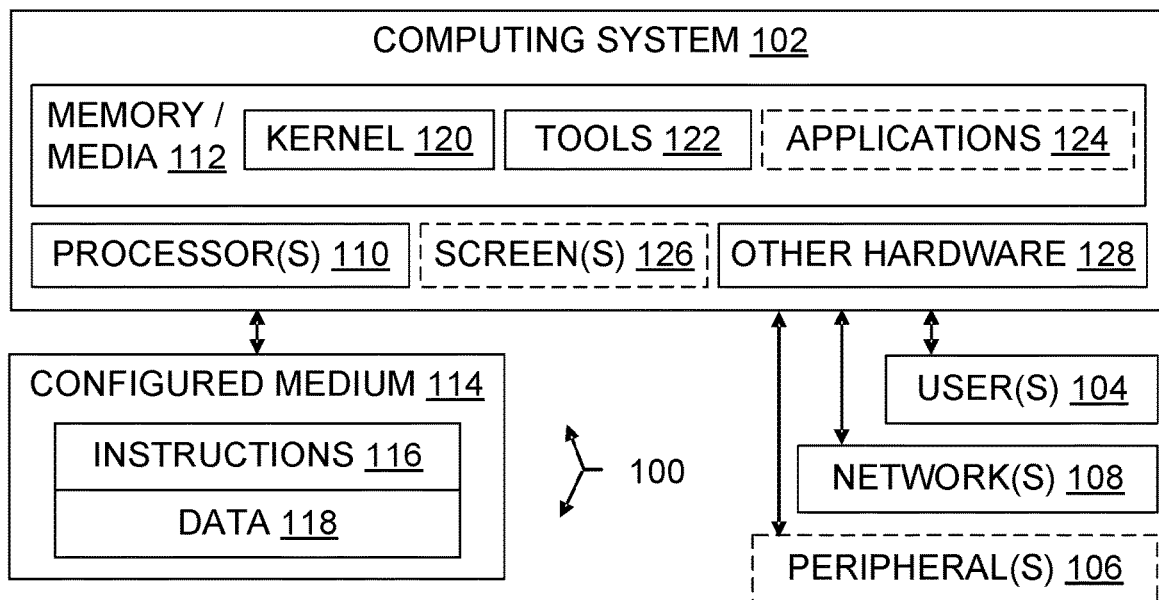
FIG. 1 is a block diagram illustrating computer systems generally and also illustrating configured storage media generally.

Many innovations expand beyond their origins, but understanding an innovation's origins can help one more fully appreciate the innovation. In the present case, some teachings described herein were motivated by technical challenges of optimizing function code in libraries. Relevant aspects of library functions are often unknown to a compiler and thus the functions are not susceptible to optimizations such as constant folding. In constant folding, certain executable code is replaced by a constant value, without breaking the program. However, the teachings presented herein are not limited to that context. Other technical challenges addressed by the innovations taught here will also be apparent to one of skill from the discussion provided below.

As a motivating example, compilers often include optimization steps that perform constant folding, in order to reduce execution time of the generated code by evaluating parts of the program at compile time. These optimizations often are based on built-in knowledge of primitive data types and built-in knowledge of which operations are safe to optimize. Relevant aspects of library functions, such as the extent of their functional purity (e.g., as to exceptions or side-effects), are often unknown to the compiler. Thus, the library functions and their execution context are not well suited to some optimizations. This innovation disclosure describes rich semantic mechanisms that provide information to a compiler to allow it to perform more thorough optimizations.

Some embodiments described herein may be viewed by some people in a broader context. For instance, concepts such as annotation, constancy, execution, optimization, syntax, and translation may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to make information about program optimization opportunities available outside the context of a particular compilation or a particular development environment. Other configured storage media, systems, and processes involving annotation, constancy, execution, optimization, syntax, or translation are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular translators, software development environments, programming languages, syntax graph examples, development tools, identifiers, files, data structures, notations, control flows, pseudocode, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as code optimization and the translation of code from one form (e.g., source code in a high-level programming language or in assembly language) to another form (e.g., assembly language or byte code or p-code or machine code), which are activities deeply rooted in computing technology. Some of the technical mechanisms discussed include, e.g., a syntax graph, algorithms for traversal of a syntax graph, syntax subgraph structures, algorithms for recognition of syntax subgraph structures, an optimization catalog, algorithms using or updating entries in an optimization catalog, various kinds of hash values, and optimization characteristic annotations (which are data structures or portions thereof). Some of the technical effects discussed include, e.g., optimized code achieved by a replacement of code by a constant (i.e., constant folding), memoized data, memoized instructions, and persistence of semantic information about optimization opportunities via annotations stored in source code, in translator output, or in an optimization catalog, for example. Thus, purely mental processes are excluded. Some embodiments improve the functioning of computing systems by making code optimizations more available in practice. Other advantages based on the technical characteristics of the teachings will also be apparent to one of skill from the description provided.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IaaS or IAAS: infrastructure-as-a-service
ID: identification or identity
IDE: integrated development environment, sometimes also called an "interactive development environment"
IDS: intrusion detection system, may be or include an HIDS (host-based IDS) or an NIDS (network-based IDS), for example
IoT: internet of things
IP: internet protocol
LAN: local area network
OS: operating system
PaaS or PAAS: platform-as-a-service
RAM: random access memory
ROM: read only memory
UEFI: Unified Extensible Firmware Interface
VM: virtual machine
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering, in a cloud computing environment or other network or computing system environment, which provides resources or resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as automatically traversing at least part of a syntax graph, recognizing a subgraph structure in a syntax graph, annotating a syntax graph, accessing an optimization catalog, computing a hash value, rewriting a syntax graph, memoizing code, and many other operations discussed, are understood herein as inherently digital. A human mind cannot interface directly with a CPU or other processor, or with RAM or other digital storage, to read and write the necessary data to perform the code translation optimization steps taught herein. This would all be well understood by persons of skill in the art in view of the present disclosure, but others may sometimes need to be informed or reminded of the facts.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, annotating, ascertaining, assigning, associating, compiling, consulting, disabling, discerning, enabling, enhancing, entering, evaluating, executing, finding, hashing, identifying, including, indicating, inserting, invoking, listing, matching, memorizing, naming, optimizing, passing, performing, prioritizing producing, recognizing, recompiling, reducing, relying, removing, replacing, rewriting, saving, scanning, throwing, translating, traversing, triggering, updating (and accesses, accessed, annotates, annotated, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

Figure 6:
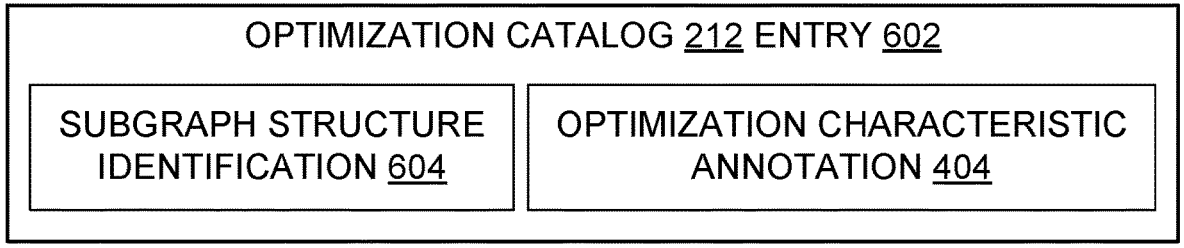
FIG. 6 is a block diagram illustrating an optimization catalog entry.
Figure 7:
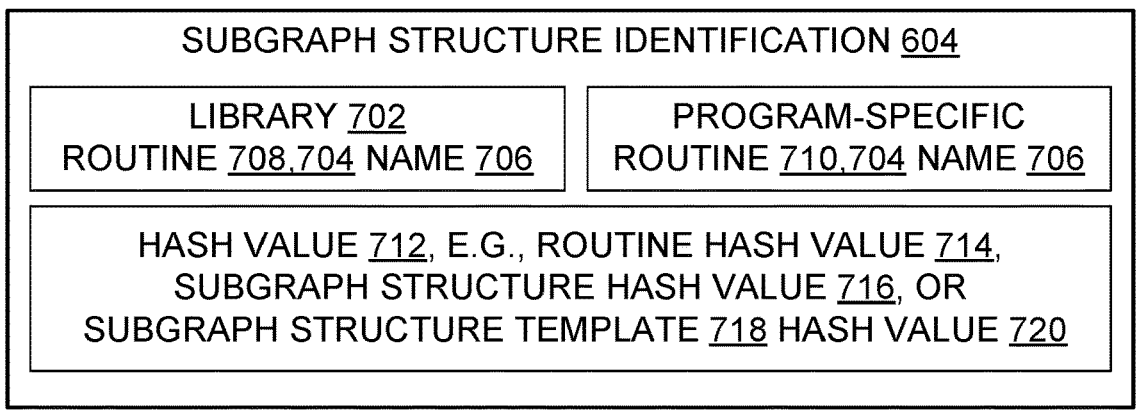
FIG. 7 is a block diagram illustrating a syntax subgraph structure identification.
Figure 8:
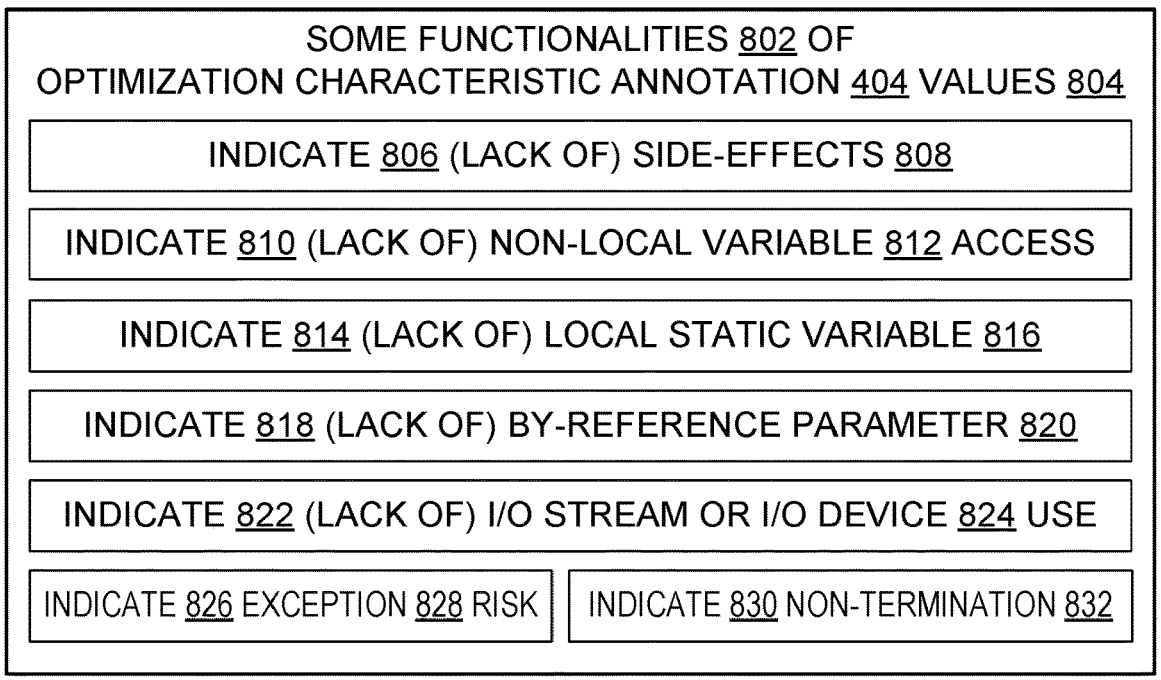
FIG. 8 is a block diagram illustrating some functionalities of some values in some optimization characteristic annotations.

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, debuggers, profilers, compilers, interpreters, software development tools and tool suites, hardware development tools and tool suites, diagnostics
124 applications, e.g., word processors, web browsers, spreadsheets, games, email tools
126 display screens, also referred to as "displays"
128 computing hardware not otherwise associated with a reference number 106, 108, 110, 112, 114
202 code translation environment
204 program being translated; may be part or all of a kernel 120, tool 122, application 124, or other software
206 translator (e.g., compiler or interpreter) enhanced with code translation optimization functionality (e.g., functionality illustrated in or discussed in connection with FIG. 4, FIG. 6, FIG. 7, FIG. 8, FIG. 11, FIG. 12, or FIG. 13); 206 also refers to a computing system 102 configured with code translation optimization functionality
208 translation of code, i.e., output from translator 206
210 optimized program code
212 optimization catalog; may have been updated by translator 206; 212 refers not only to data stored in catalog entries 602 but also to an API or other interface software which helps maintain the catalog data and provides access to the catalog data 602
214 code generally, whether optimized or not
216 source code generally, whether annotated or not
302 cloud; may also be referred to as "cloud computing environment"
304 virtual machine, e.g., a computing construct which provides hardware virtualization and includes an operating system; although containers 308 differ from virtual machines as to inclusion of a guest operating system, containers and virtual machines are functionally similar for purposes of the present disclosure because both may run a translator 206 and both run as code that can be optimized by a suitable translator 206, and therefore unless indicated otherwise any reference to virtual machines also refers to containers
306 integrated development environment
308 container, e.g., a computing construct which provides user space virtualization and does not itself include an operating system
402 optimization characteristic, e.g., whether code may (or does) have side-effects when executed, whether code may (or does) access a non-local variable when executed, and so on; these and other examples of optimization characteristics are illustrated in FIG. 8 (which is not necessarily exhaustive for a given embodiment)
404 optimization characteristic annotation, namely a data structure (which may be as simple as a bitflag or enumeration value or other data value) which indicates an optimization characteristic
406 graph annotator, namely, code which upon execution annotates a syntax graph with an optimization characteristic annotation
408 program 204 code 214 corresponding to an annotation 404 in a syntax graph
410 syntax graph; as used herein, a "syntax graph" is a graph data structure which represents at least syntactic structure of at least a portion of a program 204; a syntax graph may also represent data type information of the program; some examples of syntax graphs include abstract syntax trees (ASTs), and parse trees; trees and directed acyclic graphs (DAGs) are some examples of graphs 412 syntax graph traverser, namely, code which upon execution traverses a syntax graph; unless otherwise stated, traversal is performed in a tree portion of the syntax graph in a bottom-up manner, e.g., using the traversal employed in a depth-first search 414 syntax graph node, namely, a data structure which contains syntactic information and has a location in a syntax graph; the location may be defined by the node's connection(s) to other node(s) of the syntax graph; syntax graphs are directed graphs, i.e., any two given syntax graph nodes that are connected directly to one another have a parent-child relationship, unless stated otherwise 416 connection between nodes 414; the connection may be implemented, e.g., as a pointer or index that identifies the connected node explicitly and also indicates explicitly or implicitly which node is a parent or child of which other node 418 syntax subgraph structure, e.g., a syntax graph subtree representing a binary operator and its operands, or a syntax graph subtree representing a function call which passes a parameter by reference instead of by value, or a syntax graph subtree representing a try-catch exception handling piece of code, or a syntax graph subtree representing a constant value, or another syntax subgraph structure representing code which has some aspect 502 of execution values or execution effects that is discernable at translation time before execution 420 syntax subgraph structure recognizer, namely, code which upon execution recognizes a predefined syntax graph subgraph structure; recognition may be accomplished, e.g., by comparing a hash or vectorization or other representation of a portion of a syntax graph to an entry in an optimization catalog 422 user interface generally; may include a graphical user interface (GUI) or an application program interface (API) or both, for example 424 optimizer generally; 424 also refers to pluggable implementations of an optimizer; an optimizer is code which upon execution takes a piece of code X or a representation thereof as an input and produces an optimized code X' or a representation thereof as an output 426 syntax graph rewriter 502 an aspect of code that is relevant to translation-time optimization 504 a value taken or produce by code during execution of the code 506 a delimitation of possible execution values 504

508 an effect of execution of code, e.g., a side-effect of a function, or a change in a variable that is external to the code but accessed by execution of the code, or an exception caused by execution of the code; 508 also refers to non-effects of execution of code, e.g., the absence of any side-effect of a function, or the absence of any change in a variable that is external to the code, or the absence of a particular exception from execution of the code 602 entry in an optimization catalog 604 subgraph structure identification suitable for use in an optimization catalog entry; also refers to the act of identifying a subgraph structure or subgraph structure template 702 library of code which can be dynamically linked in, linked by a linker, or otherwise included in an executable program 704 routine generally, e.g., function, procedure, handler, or another piece of code that is parameterizable or invocable or both 706 name of a routine 708 a routine 704 that is part of a library 702 and thus configured for use in multiple programs (different programs may share a single copy of the routine, or they may have respective copies of the routine)

710 a routine 704 that is specific to a particular program, as opposed to being a library routine 712 hash value generally 714 hash value of a routine 704; routines which differ in their parameters or their bodies will have different hash values; a given implementation may calculate a routine's hash value from the routine's source code, or from a syntax graph representation of the routine, or both, for example 716 hash value of a subgraph structure 418; subgraph structures which differ in their number or kind of nodes 414 will have different hash values 718 subgraph structure template, namely, a data structure which generalizes a group of subgraph structures by replacing details with placeholders, e.g., a constant placeholder instead of a particular constant, or a parameter-list as a placeholder for a specific number and specific order of routine parameters 720 hash value of a subgraph structure template; subgraph structure templates which differ in their number or kind of nodes 414 will have different hash values 802 functionality of a value in an optimization characteristic annotation 804 value in an optimization characteristic annotation 806 indicates semantic information about a side-effect of executing program code; 806 refers to an act of indicating (verb) and also refers to an indication (noun)

808 side-effect of code; a side-effect of a routine is any change in program state which is caused by execution of the routine except the return value of a function or state changes cause by the return value of the function, e.g., a side-effect occurs when a function sets a global variable and then returns a value 810 indicates semantic information about a non-local variable access by program code; 810 refers to an act of indicating (verb) and also refers to an indication (noun)

812 a non-local variable; 812 also refers to an act of accessing a non-local variable 814 indicates semantic information about a local static variable access by program code; 814 refers to an act of indicating (verb) and also refers to an indication (noun)

816 a local static variable; 816 also refers to an act of accessing a local static variable 818 indicates semantic information about program code passing a parameter to a routine by reference rather than passing it by value; 818 refers to an act of indicating (verb) and also refers to an indication (noun)

820 a parameter passed to a routine by reference; 820 also refers to an act of passing a parameter to a routine by reference 822 indicates semantic information about program code using an I/O device or an I/O stream or both; 822 refers to an act of indicating (verb) and also refers to an indication (noun)

824 use of an I/O device or an I/O stream or both; 824 also refers to an act of using an I/O device or an I/O stream or both, and to an I/O device or an I/O stream or both; some examples include a read from a file even if the file is empty or static 826 indicates semantic information about program code throwing an exception during execution; 826 refers to an act of indicating (verb) and also refers to an indication (noun)

828 an exception, e.g., overflow, attempted division by zero, out-of-bounds access attempted, bad pointer; 828 also refers to an act of throwing an exception 830 indicates semantic information about program code failing to terminate during execution of a program containing the code; 830 refers to an act of indicating (verb) and also refers to an indication (noun)

832 termination of a piece of code, e.g., by passing control to another piece of code in a program or passing control back to a kernel upon which the program runs; "non-termination" may also be referred to by 832, when context of the reference numeral states "non" or "failure" as to termination 900 an optimization 902 reduction in processor cycles 904 reduction in memory size; may refer to RAM size generally, or to a particular part of RAM such as a heap, or to on-disk memory 906 reduction in I/O operations 908 constant folding 910 exception handler 912 reduction in use of an exception handler 914 memoization, e.g., storing computational results of particular inputs to a routine, recognizing that the same inputs have been supplied again in a subsequent invocation of the routine, and then returning the stored results instead of re-executing the routine to recalculate the same result values 1200 flowchart; 1200 also refers to code translation optimization methods illustrated by or consistent with the FIG. 12 flowchart 1202 traverse syntax graph, e.g., by executing traverser 412

Figure 12:
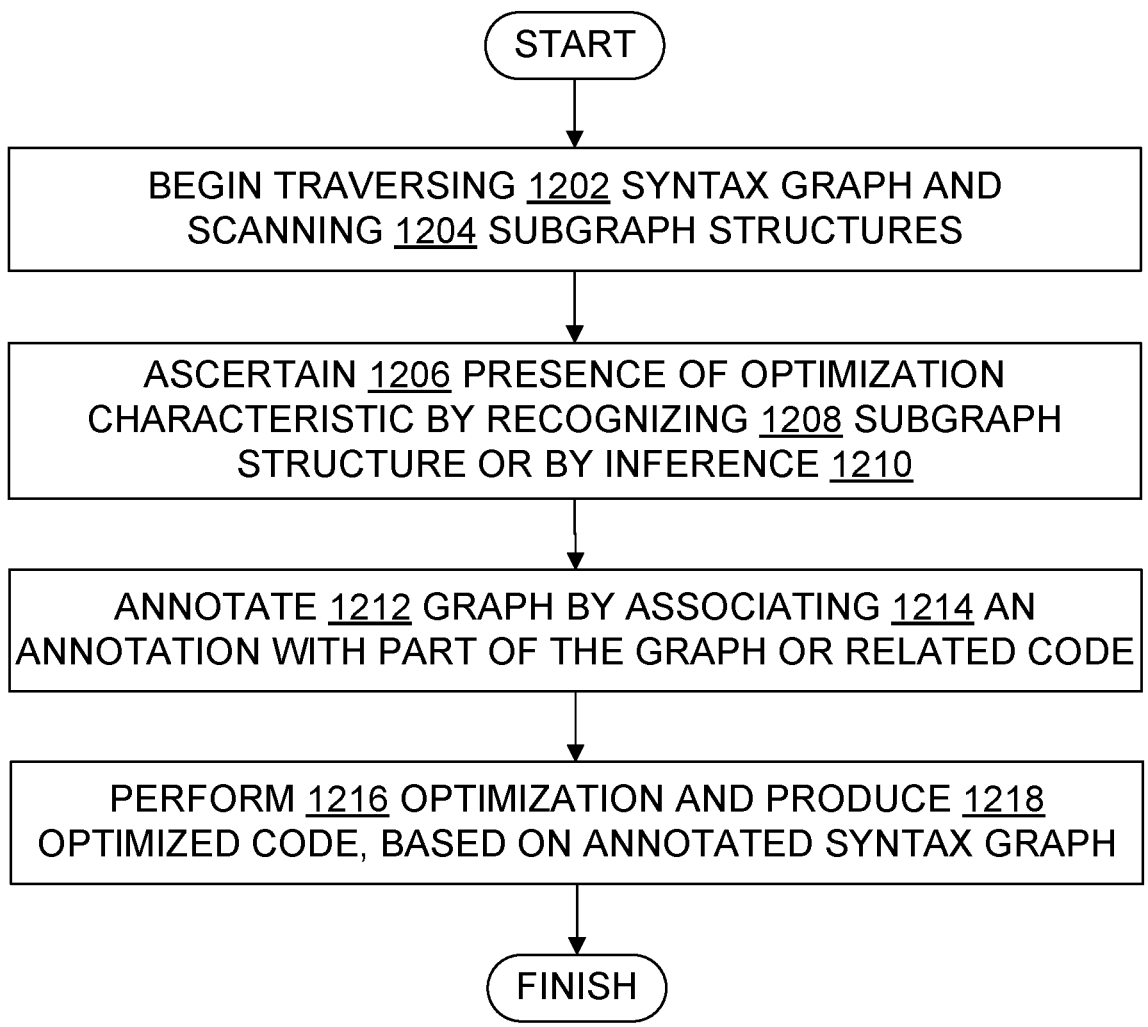
FIG. 12 is a flowchart illustrating steps in some code translation optimization methods.
Figure 13:
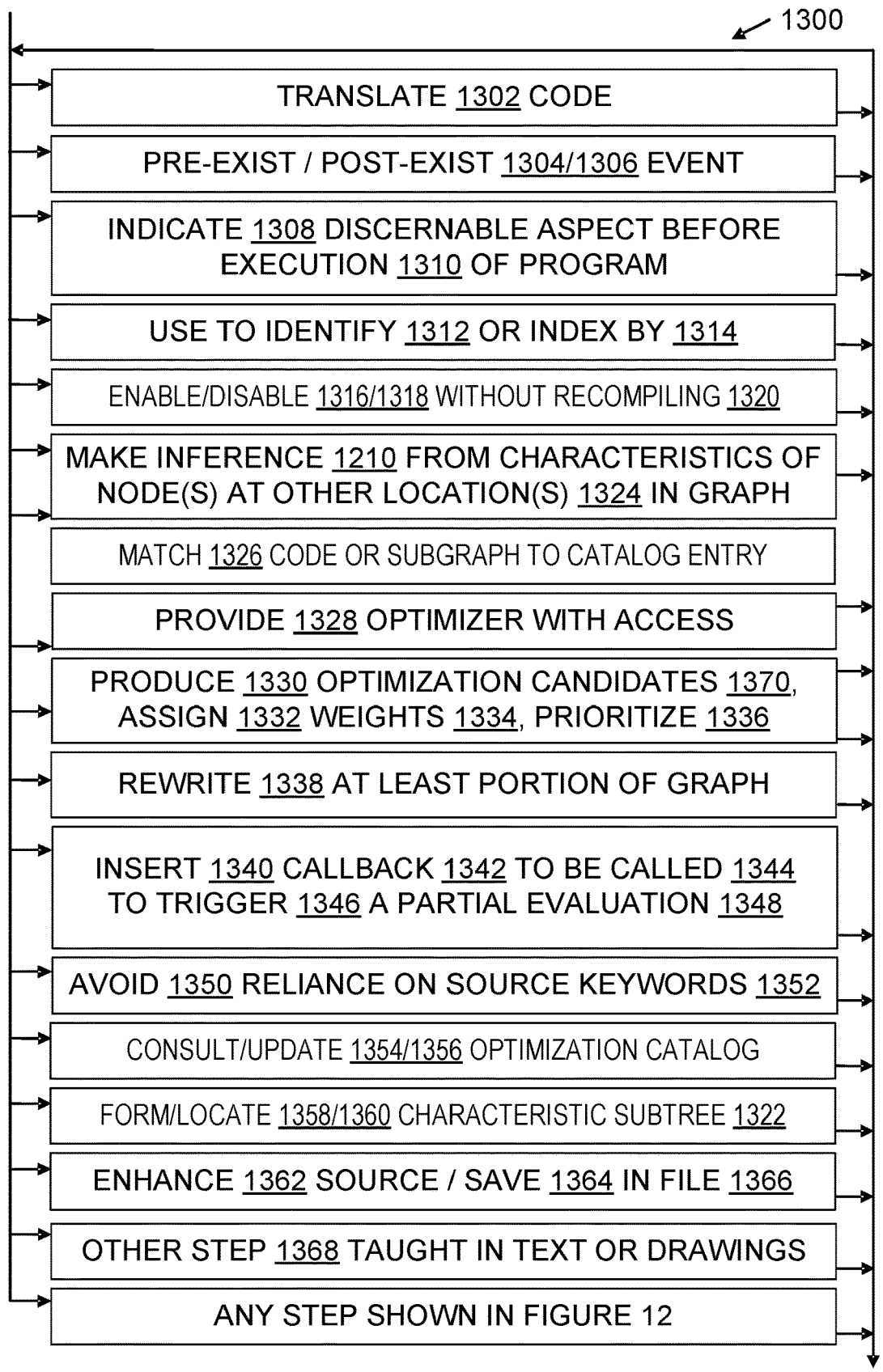
FIG. 13 is a flowchart further illustrating steps in some code translation optimization methods.

1204 scan syntax graph for matches to subgraph structures, e.g., by computing and comparing hashes or node vectorizations 1206 ascertain presence of an optimization characteristic, e.g., by recognizing a match between a subgraph structure and a catalog 212 entry or inferring a characteristic's presence at a parent node location from optimization characteristic annotations of child nodes 1208 recognize a match between a subgraph structure and a catalog 212 entry, e.g., by comparing hashes or comparing vectorizations using a similarity metric 1210 infer a characteristic's presence at a parent node location from optimization characteristic annotations of child nodes, e.g., if all child nodes are pure in the sense that they do not throw any exceptions, then a parent node whose corresponding code (e.g., code implementing a binary operator) is inferred to have that same purity 1212 annotate a syntax graph node (and hence annotate the syntax graph itself) by associating an annotation 404 with the node 1214 associate an annotation 404 with a node, e.g., by setting a bitflag or enumeration value or list pointer in the data structure implementing the node; 1214 may also refer to association of code 408 with part of a syntax graph 1216 perform an optimization, e.g., by rewriting a syntax graph or folding a constant or by generating different byte code or machine code, without breaking the program 1218 produce optimized code by generating optimized byte code or machine code or other executable code 210 without breaking the program 1300 flowchart; 1300 also refers to code translation optimization methods illustrated by or consistent with the FIG. 13 flowchart (which incorporates the steps of FIG. 12)

1302 translate code, e.g., compile code or interpret code; compilation may be ahead-of-time (AOT) or just-in-time (JIT)

1304 pre-exist an event, e.g., a catalog 212 may exist before a compilation is attempted; indeed, a catalog may pre-exist creation of some or all of the source code of a program which is subsequently optimized based in part on matches with entries 602 of the catalog 1306 post-exist an event, e.g., a catalog 212 may exist even after a compilation is completed, whereas strictly internal data structures within an optimizing compiler cease to effectively exist once the compilation is complete and the compiler process releases the memory it used while it ran 1308 indicate a discernable aspect of code or of a syntax graph representation of code; some examples of 1308 indications are shown in FIG. 8 and designated at 806, 810, 814, 818, 822, and 826

1310 an execution of a program; may be referred to as a "run" of the program; 1310 also refers to an act of at least partially executing a program 1312 identify (verb) an item; may also refer to an identification (noun)

1314 an example of identifying 1312 which involves using an offset or pointer or other index into an array, list, graph, database, or other data structure; 1314 also refers to the index 1316 enable use of a plugin or other piece of code 1318 disable use of a plugin or other piece of code 1320 recompile program code which has previously been compiled, after changing a configuration file or make file or other setting to change the functionality of the program 1322 optimization characteristic subtree 1324 a location in a syntax graph, e.g., a particular node or particular set of nodes 1326 match code of a program or a program syntax graph portion (i.e., a subgraph) to catalog entry subgraph structure identification 1328 provide an optimizer with access to a syntax graph 1330 produce optimization candidates, namely, optimizations which are possible in a given situation 1332 assign a relative weight to an optimization candidate 1334 relative weight of an optimization candidate 1336 prioritize optimization candidates for actual implementation, based at least partially on their relative weights 1338 rewrite part of a syntax graph, e.g., to perform a constant folding optimization 1340 insert a callback in a syntax graph or in code generated from a syntax graph 1342 a callback routine; also referred to simply as a "callback"

1344 call a callback; may also be referred to as invoking a callback 1346 trigger a partial evaluation of executable code 1348 a partial evaluation of executable code 1350 avoid relying on keywords in source code to indicate 1308 a discernable aspect 1352 programming language keyword, e.g., constexpr keyword in C++

1354 consult a catalog 212, e.g., by searching the catalog 1356 update a catalog 212, e.g., by adding an entry 602 or modifying an entry 602 or deleting an entry 602 or changing the order of entries 602

1358 form a characteristic subtree, e.g., by inferring that a parent node is pure (or not pure) based the purity (or lack of purity) of child nodes 1360 locate (that is, find) a characteristic subtree in a syntax graph 1362 enhance source code by adding an annotation 404

1364 save an annotation, or an annotated syntax graph, in a file 1366 a file 1368 any step discussed in the present disclosure that has not been assigned some other reference numeral 1370 optimization candidates, namely, optimizations which may be possible to perform but have not yet been performed Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

A given operating environment 100 may include an Integrated Development Environment (IDE) 122, 306 which provides a developer with a set of coordinated computing technology development tools 122 such as compilers, interpreters, decompilers, assemblers, disassemblers, source code editors, profilers, debuggers, simulators, fuzzers, repository access tools, version control tools, optimizers, collaboration tools, and so on. In particular, some of the suitable operating environments for some software development embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C # ("C-Sharp"), but many teachings herein are applicable with a wide variety of programming languages, programming models, and programs.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

With reference to FIGS. 1 through 11, some embodiments use or provide a functionality-enhanced system 206. The functionality enhancement promotes code optimization by providing technical mechanisms which can (a) make code optimization opportunities more visible to developers, e.g., as annotations 404 in a catalog or source code, and (b) make code optimization opportunities persist outside the scope of a compiler's internal workings, e.g., as annotated syntax graphs that are provided as compiler output and reusable as input to subsequent compilations.

Figure 2:
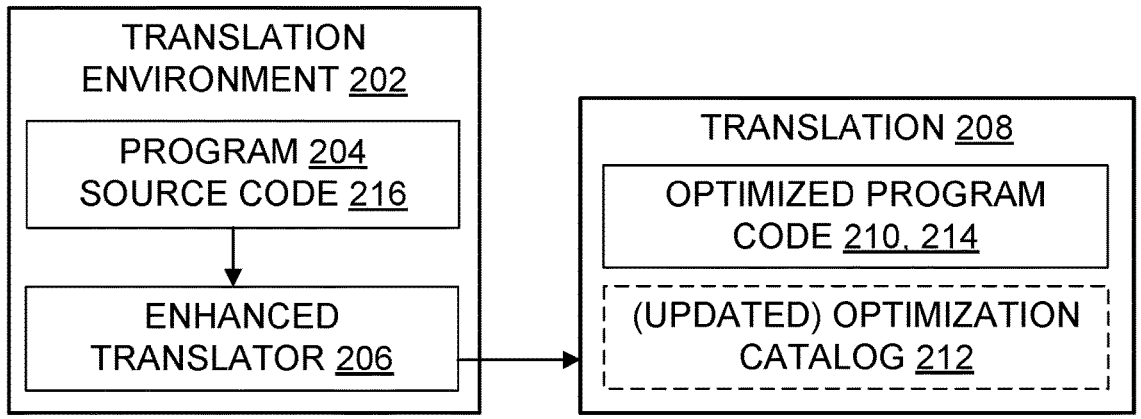
FIG. 2 is a block diagram illustrating a computing environment with code translation functionality.

FIG. 2 illustrates an enhanced translator 206 in a translation environment 202. A program 204 fed into the enhanced translator 206 yields optimized program code 210 as output, and may also yield an optimization catalog 212, or updates thereto, as output. That is, a translation 208 is not necessarily limited to the machine code or byte code, but may in some embodiments also include persistent optimization characteristic annotations 404 in the form of a catalog 212 or annotated source code 216, for example.

Figure 3:
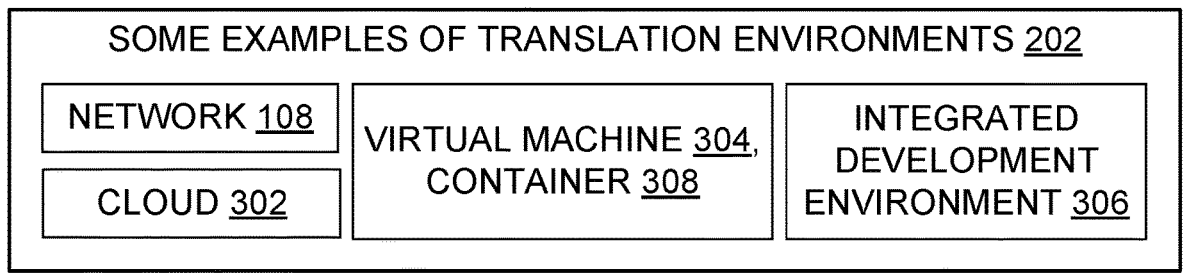
FIG. 3 is a block diagram illustrating some examples of code translation environments.

FIG. 3 shows some examples of translation environments 202. Examples listed include a network 108, a cloud 302, a virtual machine 304 or container 308, and an integrated development environment 306. However, one of skill will recognize that a translator 206 may also run in other environments, and that some of these environments may overlap, e.g., a virtual machine 304 may reside in a cloud 302.

Figure 4:
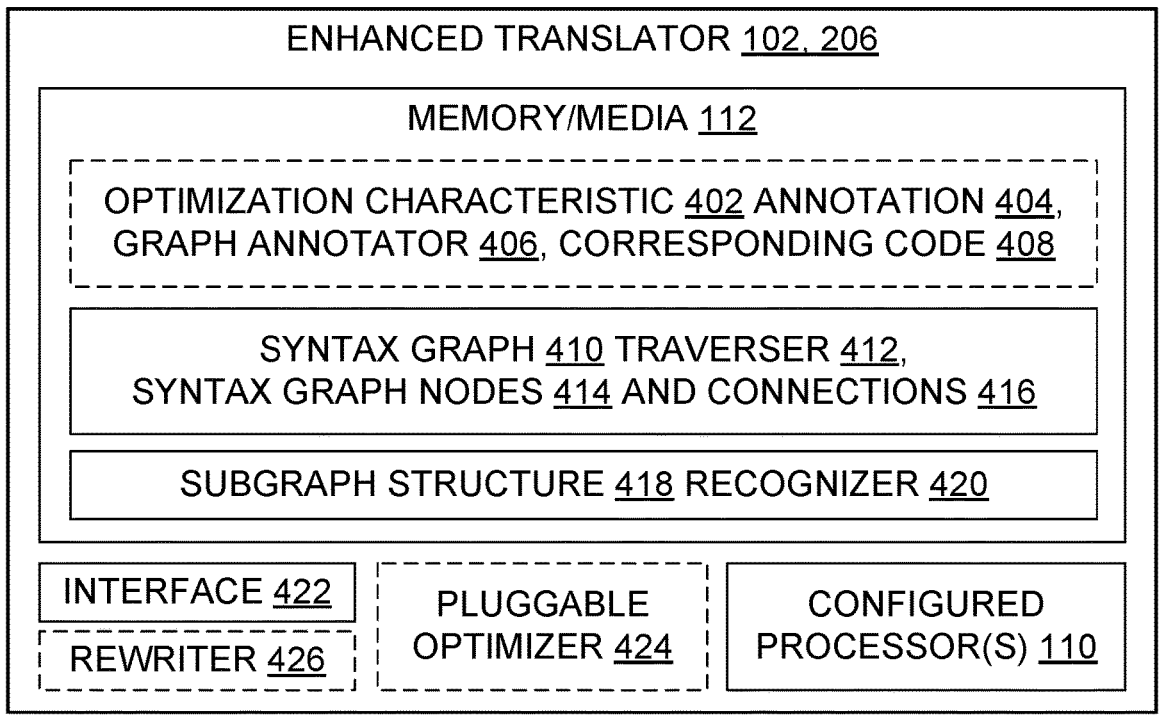
FIG. 4 is a block diagram illustrating aspects of a system which is configured for code translation using syntax graph optimization annotation functionality.

FIG. 4 illustrates an enhanced code translator 206, in the form of a system 102 with enhanced functionality for code translation optimization. In this example, functionality enhancements include a graph annotator 406 which is invoked by or in coordination with a syntax graph traverser 412 and a subgraph structure recognizer 420. The syntax graph traverser 412 traverses connected 416 nodes 414 of a syntax graph 410, which is a parse tree, abstract syntax tree, or similar representation of the structure of some program 204 code 214. The subgraph structure recognizer 420 recognizes certain subgraph structures 418 in the syntax graph 410, namely, subgraph structures 418 which have optimization characteristics 402 (discernable qualities) such as a lack of side-effects, a limitation on runtime exceptions, no usage of local static variables or by-reference parameters, and so on. A discernable lack of such qualities is also considered an optimization characteristic 402. The graph annotator 406 places optimization characteristic annotations 404 accordingly in the syntax graph 410. The annotations 404 can then be used by an optimizer 424 which is part of, or is coordinated with, the translator 206 to perform code optimizations during code translation, e.g., by folding code 408 into a constant.

Figure 5:
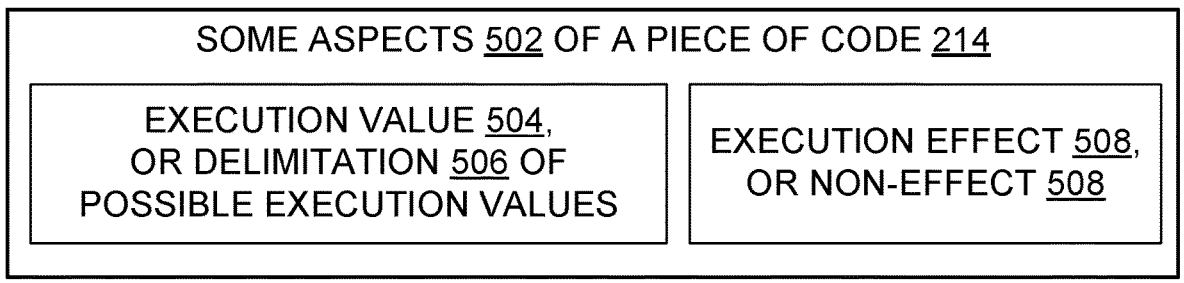
FIG. 5 is a block diagram illustrating some execution-related aspects of a piece of code.

FIG. 5 shows some aspects 502 of code 214, in the form of two categories of discernable optimization characteristics 402. One category involves specific execution values 504 discernable prior to execution, or delimitations 506 on execution values 504 which are discernable prior to execution. For example, an enhanced translator may discern from a syntax graph that a certain Boolean expression will always evaluate to true 504 when executed, or that a certain arithmetic expression is delimited 506 in that it will always yield a non-zero value 504 when executed. Another category of optimization characteristics 402 includes execution effects 508, or non-effects 508. For example, an enhanced translator may discern using a syntax graph that a certain piece of code 408, 214 might throw a divide-by-zero exception, and that another piece of code 408, 214 is a pure function (e.g., like sin(x)) that does not have any side-effects.

FIG. 6 illustrates an entry 602 in an optimization catalog 212. The example shown includes an identification 604 of a syntax subgraph structure 418 together with a corresponding optimization characteristic annotation 404. For example, an entry 602 En may identify a subgraph structure 418 that matches a division operator and include an annotation 404 indicating that a division-by-zero exception is possible. Similarly, an entry 602 Em may identify a subgraph structure 418 that matches a library sine( ) function or a library cosine( ) function and include an annotation 404 indicating that no side-effect is possible. Unlike transient data structures used inside an optimizing compiler solely during compilation, the catalog 212 exists before the launch of a compilation that uses the catalog, and the catalog persists even after the compilation is completed. The catalog 212 may also be available for use by multiple tools 122, instead of being functionality that is hard-coded within a single compiler and thus usable only by that single compiler.

FIG. 7 shows some examples of syntax subgraph structure identifications 604. Two examples are names 706 of routines 704; one group is routines 708, 704 belonging to a library 702, and another group is routines 710, 704 which are specific to a particular program 204 (sometimes called "user-defined routines").

A library 702 may be enhanced as taught herein by determining the optimization characteristics 402 of its routines 708 and creating catalog entries 602 accordingly. For example, the math library routines for certain functions such as sine( ), cosine( ), absolute value, exponentiation, truncation, min, max, mean, and others, may have entries 602 indicating that these functions are pure in the sense that they have no side-effects, have no local static variables, and do not use I/O streams.

Some of the syntax subgraph structure identification 604 examples illustrated in FIG. 7 include a hash value 712. Hash values may be calculated used a secure hash algorithm (SHA), message digest algorithm such as MD5, or other hash function. Hash functions used may be cryptographically secure in some implementations, but not necessarily in every implementation. Hash values used may include a hash 714 of a routine 704, a hash 716 of a subgraph structure 418, a hash 720 of a subgraph structure template 718, or a combination thereof, for example.

FIG. 8 illustrates some examples of optimization characteristic annotation functionality 802, as expressed in or represented by values 804 in data structures which implement optimization characteristic annotations 404. The values may be bitflags, enumeration values, integer or Boolean flags, pointers in a list, or other data values, depending on particularities of an implementation. The functionality 802 of a given annotation 404 is an indication regarding an execution effect 508 or execution value 504 of code 408 which is discernible prior to execution of the code 408. Some examples of execution effects 508 include side-effects 808, non-local variable 812 access, local static variable 816 access, access to a by-reference parameter 820 (which is a special case of non-local variable 812 access), and exceptions 828 (division by zero, overflow, etc.). Use of an I/O device or I/O stream may also be considered an execution effect 508, or it may be viewed as a negative delimitation 506 on execution values (or as a positive delimitation 506 if the values obtainable through the I/O use are constrained in a known way). An annotation may indicate a delimitation 506 of execution values if it is known at compile time that a variable or expression cannot be zero, or cannot be negative, or must be in the range between −1 and +1, for example. An annotation 404 may indicate 830 non-termination 832 of a function or a subgraph (e.g. a "while (true)" loop, or functions that terminate the program). Recognizing a non-terminating piece of code via annotation allows subsequent evaluations to be discarded, e.g., f( )+go where f( ) is proven to be non-terminating is itself non-terminating (propagation 1210 of the annotation), and enables go to be discarded (because it never runs) and replaced by an irrelevant constant, or the whole node to be reduced to "f( ); throw;".

In this example, annotation values 804 may indicate 806 information about side-effects, including a presence or absence or possibility of side-effects 808. Annotation values 804 may also or alternatively indicate 810 information about access (read or write or both, per the implementation) to a non-local variable 812, including a presence or absence or possibility of such access. Annotation values 804 may also or alternatively indicate 814 information about access to a local static variable 816, including a presence or absence or possibility of such access. Annotation values 804 may also or alternatively indicate 818 information about access to a by-reference parameter 820, including a presence or absence or possibility of such access. Annotation values 804 may also or alternatively indicate 822 information about access to an I/O device or I/O stream 824, including a presence or absence or possibility of such access. Annotation values 804 may also or alternatively indicate 826 information about one or more specific exceptions 828, including a presence or absence or possibility of such exception(s) being thrown. Annotation values 804 may also or alternatively indicate 830 information about termination or non-termination 832 of a piece of code.

Figure 9:
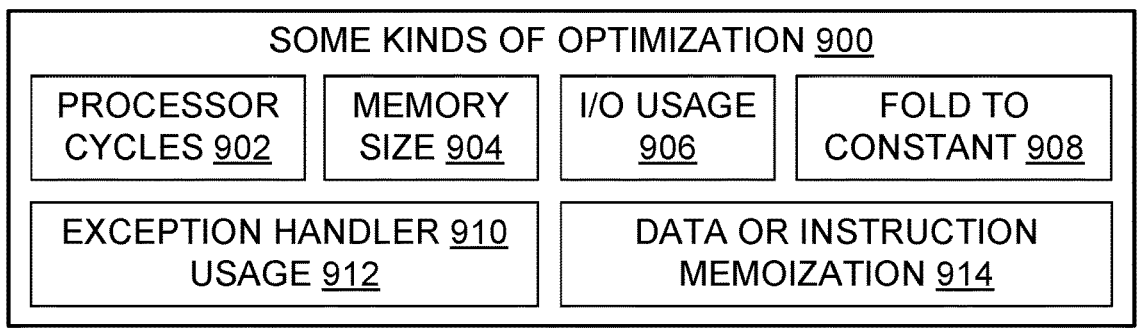
FIG. 9 is a block diagram illustrating some examples of different kinds of optimization.

FIG. 9 illustrates some examples of optimization 900 categories. Some optimizations 902, 900 reduce the number of processor 110 cycles performed during execution. Some optimizations 904, 900 reduce the amount of memory 112 (RAM, processor cache, disk, heap, etc.) used during execution. Some optimizations 906, 900 reduce the use of an I/O device or I/O stream 824 during execution. Some optimizations 908, 900 replace code that performs a sequence of computations during execution with code that represents a constant value. Some optimizations 912, 900 reduce the use of an exception handler 910 during execution, by reducing or eliminating (which is an extreme example of reduction) runtime exceptions 828. Some optimizations 914, 900 replace code that performs a sequence of computations during execution with code that sometimes returns a previously calculated value 504 instead of re-calculating the value. One of skill will also recognize that other optimizations 900 may also be implemented using characteristics 402 and annotations 404, and be performed according to the teachings herein.

Figure 10:
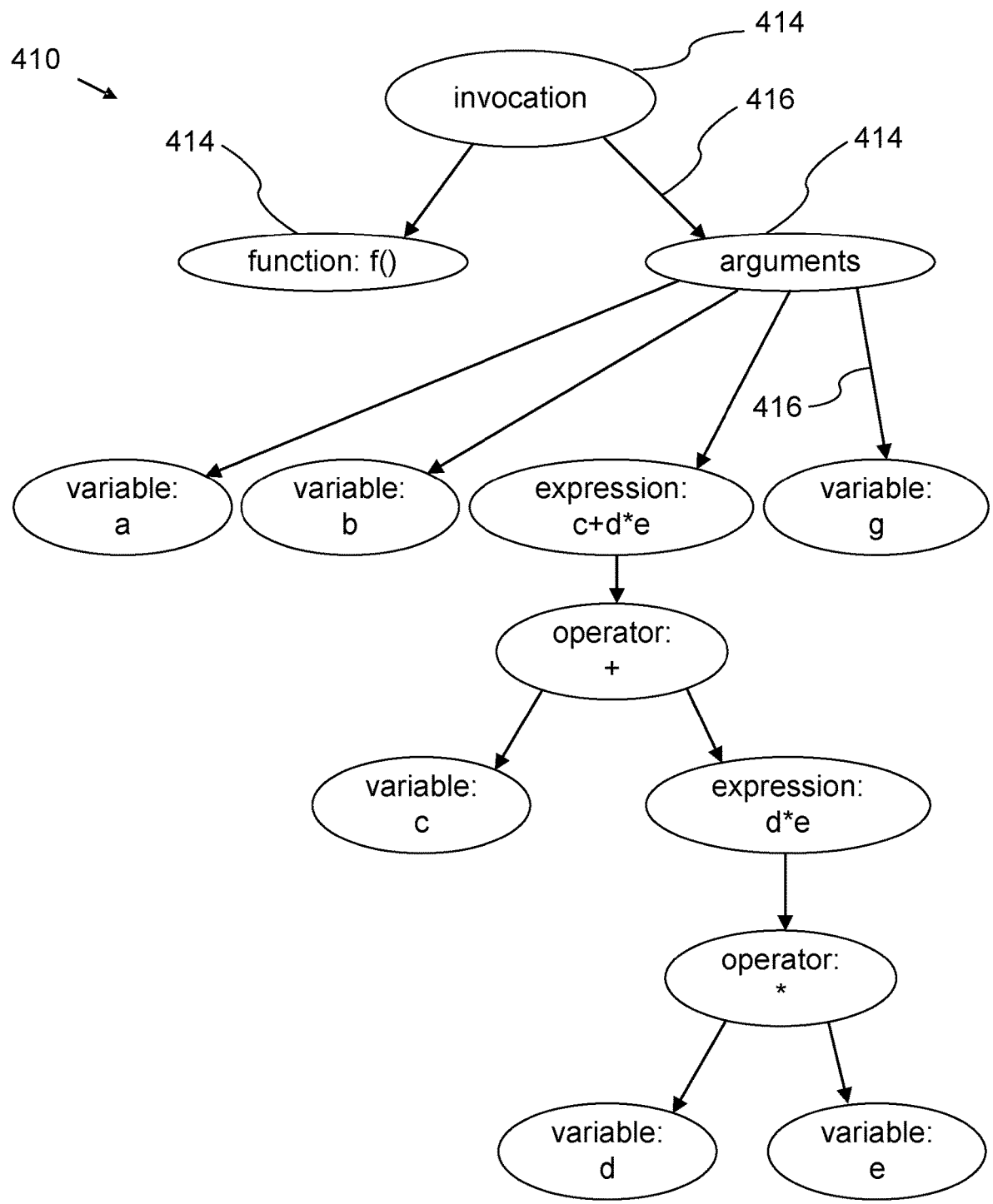
FIG. 10 is a syntax graph diagram.

FIG. 10 shows an example of a syntax graph 410, based on code 214 that can also be represented as "f(a, b, c+d*e, g)", where f is a function name 706, the parentheses enclose arguments passed to an invocation of the function, the plus sign "+" indicates addition, and the asterisk "*" indicates multiplication. This example syntax graph includes explicit syntax element identifiers such as "function", "arguments", "variable", "expression", and "operator", for reader convenience. But one of skill will acknowledge that such syntax element identifiers may be implemented, e.g., as enumeration values in a data structure, and maybe implicit or be omitted in other syntax graph representations. No optimization characteristic annotations 404 are shown in FIG. 10, but they could be added by an annotator 406.

Figure 11:
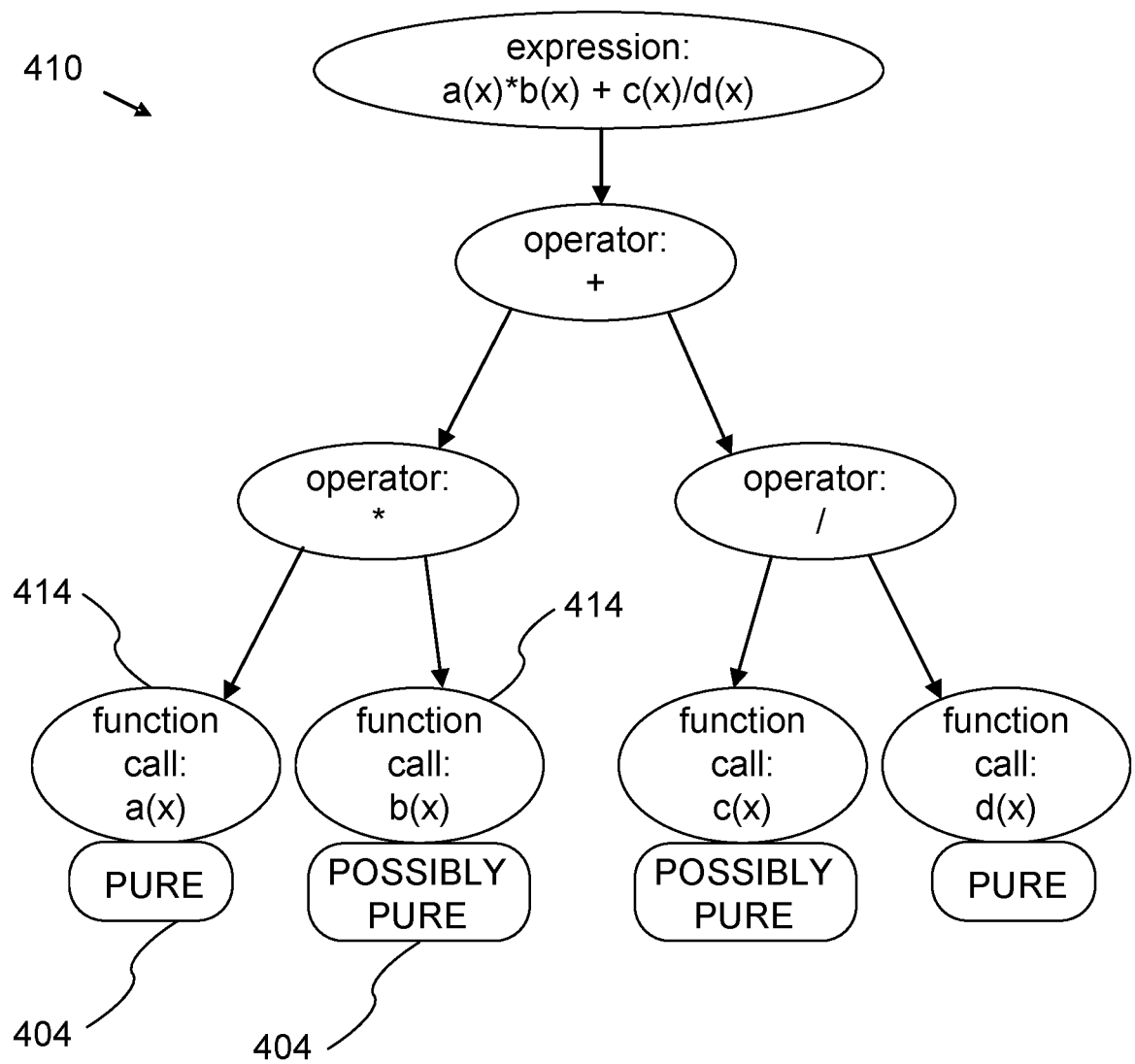
FIG. 11 is another syntax graph diagram.

FIG. 11 shows an example of another syntax graph 410, based on code 214 that can also be represented as the expression "a(x)*b(x)+c(x)/d(x)" where a, b, c, and d are each a function name 706, the sets of parentheses each enclose a parameter x which happens to be passed to each function invocation, the plus sign "+" indicates addition, the asterisk "*" indicates multiplication, and the slash "/" indicates division. The syntax graph of FIG. 11 represents multiple possible optimization situations and different codes 214, depending on the meaning of "pure" in the annotations 404 and the characteristics of the particular functions a, b, c, d.

Annotations 404 are shown in FIG. 11. In this example, "pure" is a label which means one or more of the indications 806, 810, 814, 818, 822, or 826, depending on the implementation. Purity may have other meanings in other examples. In a particular situation, functions a and d may be known to be pure in the sense that they have no side-effects 808, whereas functions b and c are only possibly pure, in the sense that whether they have side-effects has not been determined.

Some embodiments use or provide a code translation optimization system 206, 102 which includes a memory 112 and a processor 110 in operable communication with the memory. The processor is configured to perform steps which include (a) traversing at least a portion of a syntax graph 410 of a program 204, (b) recognizing a predetermined subgraph structure 418 in the syntax graph, and (c) associating an optimization characteristic annotation 404 with the recognized syntax subgraph structure. The resulting association indicates an extent to which an aspect 502 of a piece of code 408, 214 that corresponds to the recognized subgraph structure is discernable prior to execution of the piece of code. The aspect 502 includes an execution value 504 or an execution effect 508 or both. In this example, the processor is configured to (d) perform an optimization 900 of a code translation 208 of the program based at least in part on a result of the associating step.

In some embodiments, the memory 112 includes (e.g., contains, is configured by) a catalog 212 having an entry 602. The entry 602 includes an identification 604 of the subgraph structure 418 and also includes the optimization characteristic annotation 404 which is associated with the identified subgraph structure. A given entry 602 may correlate one or more subgraph structures with one or more annotations 404. The catalog entry 602 is in existence prior to the code translation of the program 204 and is also in existence after the optimization of the code translation of the program is performed.

In some embodiments, the identification 604 of the subgraph structure includes or is indexed by at least one of the following keys: a name 706 of a routine 708, 704 of a library 702 which is utilized by the program 204; a name 706 of a user-defined routine 710, 704 which is part of the program 204 and is specific to the program; a hash value 714 of a routine; a hash value 716 of the subgraph structure; or a hash value 720 of a syntax subgraph structure template 718. A template 718 may be viewed as a way to drill one or more holes in a syntax tree in order to perform an entry 602 identification match modulo any of a set of different constants or other trivialities from the syntax perspective.

In some embodiments, the optimization characteristic annotation 404 includes at least one of the following: a value indicating 806 whether the piece of code that corresponds to the recognized subgraph structure has no side-effect during an execution of the piece of code; a value indicating 810 whether the piece of code that corresponds to the recognized subgraph structure accesses any non-local variable during an execution of the piece of code; a value indicating 814 whether the piece of code that corresponds to the recognized subgraph structure has any local static variable; a value indicating 818 whether the piece of code that corresponds to the recognized subgraph structure has any parameter which is passed by reference to support an execution of the piece of code; a value indicating 822 whether the piece of code that corresponds to the recognized subgraph structure accesses any I/O device or I/O stream during an execution of the piece of code; a value indicating 830 whether the piece of code fails to terminate after an execution of the piece of code has begun; or a value indicating 826 whether the piece of code that corresponds to the recognized subgraph structure may throw an exception during an execution of the piece of code.

Some embodiments include a pluggable optimizer 424 which the system 206 is configured to invoke to perform the optimization 900. An optimizer is deemed "pluggable" herein when the optimizer can be enabled or disabled or both, without recompiling code which invokes the optimizer.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided herein to help illustrate aspects of the technology, but the examples given within this document do not describe all of the possible embodiments. Embodiments are not limited to the specific component names, optimizations, algorithmic choices, data, data types, configurations, implementations, arrangements, displays, features, approaches, or scenarios provided herein. A given embodiment may include additional or different technical features, mechanisms, sequences, data structures, or functionalities for instance, and may otherwise depart from the examples provided herein.

Processes (a.k.a. Methods)

FIG. 12 illustrates a method 1200 which is an example of methods that may be performed or assisted by an enhanced system 206. The enhanced translator 206 traverses 1202 a syntax graph 410, scanning 1204 subgraph structures 418 as it goes. The translator 206 ascertains 1206 the presence of optimization characteristics, by recognizing 1208 cataloged subgraph structures or by inferring 1210 optimization characteristics from existing annotations 404 on the graph 410. The translator 206 annotates 1212 the syntax graph accordingly, by associating 1214 an annotation with the pertinent part of the graph or the corresponding code 408. Then an optimizer 424, which is part of the translator 206 or is invoked by the translator 206 or operates subsequently as a stand-alone tool 122, performs 1216 optimizations based on the annotated graph and produces 1218 optimized code 210.

FIG. 13 further illustrates code optimization methods (also referred to as processes) which are suitable for use during code translation, including refinements, supplements, or contextual actions for steps shown in FIG. 12. Technical processes shown in the Figures or otherwise disclosed will be performed automatically, e.g., by a translator 206, unless otherwise indicated. Processes may also be performed in part automatically and in part manually to the extent action by a human administrator or other human person is implicated, e.g., in some embodiments a person may specify which kinds of optimization 900 are desired. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 12 and 13. Steps may be performed serially, in a partially overlapping manner, or fully in parallel. In particular, the order in which flowchart 1200 action items or flowchart 1300 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method for finding optimization opportunities during code translation, the method including: scanning 1204 at least part of a syntax graph 410 of a program, the syntax graph having nodes 414, the syntax graph representing at least syntactic structure aspects of the program 204; ascertaining 1206 that code 408, 214 of the program which is associated with a node of the syntax graph has an optimization characteristic 402; and annotating 1212 the syntax graph according to the ascertained optimization characteristic.

In some embodiments, ascertaining 1206 that code of the program which is associated with the node of the syntax graph has the optimization characteristic includes at least one of the following: matching 1326 the code to an entry 602 in a catalog which describes the optimization characteristic; matching 1326 a syntax subgraph 418 containing the node to an entry 602 in a catalog which describes the optimization characteristic. Matching may be accomplished, e.g., by calculating and comparing respective identifications for the items; a match is established when the respective identifications are the same.

In some embodiments, ascertaining 1206 that code 408 of the program which is associated with a first node 414 of the syntax graph 410 has a first optimization characteristic 402 includes making 1210 an inference from a second optimization characteristic 402 that is associated with a second node 414 of the syntax graph 410. The first and second nodes have different respective locations 1324 in the syntax graph. The first and second optimization characteristics may have the same value or have different respective values. Inference may be used to stitch together optimization characteristics to build an optimizable subtree.

Some embodiments provide 1328 an optimizer 424 with access to the annotated syntax graph. Then the optimizer produces 1218 at least one of the following: an optimization 902, 900 which reduces a processor cycle count for an execution of the code of the program; an optimization 904, 900 which reduces a memory requirement for an execution of the code of the program; an optimization 906, 900 which reduces an I/O requirement for an execution of the code of the program; an optimization 908, 900 which at compile time replaces a piece of code of the program by a constant value; an optimization 914, 900 which memoizes data 118 or instructions 116 or both in the code of the program; or an optimization 912, 900 which removes a call or jump to an exception handler 910 in the code of the program.

In some embodiments, an optimizer 424 produces 1218 an optimization 900 based on the annotated syntax graph, and the optimization includes a rewrite 1338 of at least a portion of the syntax graph 410. For example, the graph may be rewritten 1338 to implement a constant folding, or to include a memoization 914.

In some embodiments, an optimizer 4242 produces 1330 multiple optimization candidates 1370 which are based on the annotated syntax graph. The optimizer or translator 206 assigns 1332 respective weights to at least two of the optimization candidates, and prioritizes 1336 optimization candidates based at least in part on their respective assigned weights. For example, a memory size reduction 904 may be prioritized over a speed increase 902 when the target system 102 is an IoT device with relatively little memory and little or no interaction with human users.

Some embodiments insert 1340 a callback 1342 which upon execution triggers 1346 a partial evaluation 1348 which produces an optimization 900 based at least in part on the annotated syntax graph. For example, the translator 206 may make multiple passes through a portion of a syntax graph, and may use a callback to update annotations 404 of that portion as additional information becomes available from previous passes.

In some embodiments, ascertaining 1206 does not rely 1350 on use of a programming language keyword 1352 in a source code of the program 204 specifically to denote the optimization characteristic. For instance, constant folding optimization opportunities may be identified by recognizing 1208 that each child of a node 414 will evaluate to a constant and then inferring 1210 that the parent, which performs an arithmetic operation on those constants, will also evaluate to a constant. This is in contrast to use of the C++ constexpr keyword or a similar programming language keyword 1352. Unlike the use of programming language keywords, using annotations 404 to implement additional optimizations does not require a change in a programming language specification.

In some embodiments, ascertaining 1206 includes consulting 1354 a catalog 212 which has entries 602 that each list an optimization characteristic 402 of a respective piece of code 408 or syntax subgraph structure 418 that is identified 604 in the catalog. Some embodiments update 1356 the catalog to include an additional piece of code or an additional syntax subgraph structure, and to include a corresponding optimization characteristic which matches an additional annotation 404 of the syntax graph.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as an optimization catalog 212, optimization characteristic annotations, subgraph structure identifications 604, a graph annotator 406, and a subgraph structure recognizer 420, in the form of data 118 and instructions 116, read from a removable storage medium 114 and/or another source such as a network connection, to form a configured storage medium. The configured storage medium 112 is capable of causing a computer system 206 to perform technical process steps for code translation optimization, as disclosed herein. The Figures thus help illustrate configured storage media embodiments and process (a.k.a. method) embodiments, as well as system and process embodiments. In particular, any of the process steps illustrated in FIG. 12 or 13, or otherwise taught herein, may be used to help configure a storage medium to form a configured storage medium embodiment.

Some embodiments use or provide a computer-readable storage medium 112, 114 configured with data 118 and instructions 116 which upon execution by a processor 110 perform a method for finding optimization opportunities during code translation. This method includes: scanning 1204 at least part of a syntax graph of a program, the syntax graph having nodes, the syntax graph representing at least syntactic structure aspects of the program; ascertaining 1206 that code of the program which is associated with a node of the syntax graph has an optimization characteristic; annotating 1212 the syntax graph according to the ascertained optimization characteristic; and producing 1218 an optimization of the program based at least in part on the annotated syntax graph.

In some embodiments, the method further includes forming 1358 or locating 1360 an optimization characteristic subtree 1322, namely, a set of nodes 414 that have identical or inference-relatable respective optimization characteristics 402 and that also collectively define a subtree of the syntax graph which consists of the nodes and a connection between nodes in the set.

In some embodiments, the method further includes annotating 1212 the syntax graph with a possible values annotation 506 which delimits all possible execution values 504 for a piece of code 408, 214 which can assume different values during different executions of the program, and employing 1210 the possible values annotation while producing the optimization of the program.

In some embodiments, the method includes enhancing 1362 a source code of the program by adding to the source code a textual representation of a syntax graph optimization characteristic annotation 404. In some, the method includes saving 1364 a representation of a syntax graph optimization characteristic annotation 404 in a file 1366; the file is derived from and associated specifically with the program; the annotation info is saved for use in a subsequent code translation of a version of the program. In some embodiments, the method includes entering 1356 a representation of a syntax graph optimization characteristic annotation in a catalog 212 which is not specific to the program, for use in a subsequent code translation of the program or use in a subsequent code translation of another program or both.

In some embodiments, ascertaining 1206 that a code 408 of the program, denoted here as code F, which is associated with the node of the syntax graph 410 has the optimization characteristic 402 includes ascertaining 1206 that the code F is purely functional code, in that for a given input set, executing the code F always provides the same execution result when control passes from the code F to other code. This pure functionality may occur, for instance, in situations where the code F has no local static variable or does not use such a variable to maintain state between invocations. This pure functionality may occur, for instance, in situations where the code F does not produce results based on a randomized variable, or results based on I/O stream or device reads.

Additional Examples and Observations

One of skill will recognize that not every part of this disclosure, or any particular details therein, are necessarily required to satisfy legal criteria such as enablement, written description, or best mode. Also, embodiments are not limited to the particular networks, tools, identifiers, fields, data structures, functions, constants, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

More About Annotations

In some embodiments, simple annotations 404 are either Boolean values or enumeration flags. For example, some annotations may be represented as [IsPure(true)] or [IsPure (false)], for a specified functional definition of purity, e.g., purity may be defined as having no side-effects 808. Similarly, some annotations may be represented as [ThrowsException(Never)] (never throws) or as [ThrowsException(Fatal)] (exceptions cannot be handled, e.g., corruption) or as [ThrowsException(InputValidation)] (exceptions only thrown if inputs are out of bounds, e.g., null checks).

In some embodiments, some annotations are two-valued (black/white, on/off, present/absent, etc.), while some other annotations are on a spectrum. Those on a spectrum may have some ordering, for example "never throw" is stronger than "throw for validation" which is stronger than "throw for arbitrary reasons", with regard to an exception 828.

An optimizer 424 can use annotations by combining 1210 them together at parent nodes based on annotations of child nodes, e.g., consider a subtree rooted at a parent node and representing "f(x)+g(x)". If both f and g are pure, then by inference 1210 the resulting tree rooted at the node representing the + is pure. As another example, consider a subtree rooted at a parent node and representing "f(x)/g(x)". If both f and g never throw an exception, then the resulting subtree rooted at the node representing the/may nonetheless throw an exception because if g(x) returned 0 there is an attempt to divide by zero.

In some embodiments, more complex annotations 404 contain sets or lists. For example, [PossibleExceptions(typeof(DivideByZeroException))] indicates a set or list of exceptions 828 that includes a DivideByZeroException. An embodiment may combine 1210 such annotations 404 in parent nodes using a set theory algebraic construct. For example, [ThrowsException(Never)] is equivalent to an empty set, and a binary expression node with two children will have the union of its children's possible exceptions as its set of possible exceptions. Let curly braces denote sets, and consider again the addition example above ("f(x)+g(x)") and the division example above ("f(x)/g(x)"). If f( ) may throw exception type A, and g( ) may throw exception type A or B, then f(x)+g(x) has set {A, B} of possible exception types, or {A, B, OverflowException} when the + operation has overflow detection. On the other hand, f(x)/g(x) has the set {A, B, DivideByZeroException} as possible exception types.

In some embodiments, annotations 404 can cross-influence each other. For example, some functions 704 have a domain and a range. Suppose a function f(x) has a domain [0, int.MaxValue] for x, and assume it has an annotation which declares [ThrowsException(InputValidation)]. Assume the translator or optimizer can establish that an argument bound to x is within the valid range (e.g., the argument evaluates to a constant within the valid range). Then ArgumentOutOfRangeException does not occur in the set of possible exceptions of that occurrence of the invocation of f(x) with the given argument. Similarly, if g(x) has a delimited range [1, 100], then the use of g(x) in f(x)/g(x) precludes occurrence of the DivideByZeroException.

In some embodiments, some annotators 406 or annotations 404 use path traversals to create lazily evaluated annotation values. Consider this piece of code: a(x)*b(x)+c(x)/d(x). A syntax tree 410 representation of this code is shown in FIG. 11. For clarity of illustration, only some of the possible annotations of this tree are expressly shown in FIG. 11.

An annotation 404 for the + node 414 may be something like [IsPure(IsPure(Left.Right) & IsPure(Right.Left))], which means that the node's purity is the & of the purity value determined for b(x) (Left.Right relative to +) and c(x)(Right.Left relative to +), where & represents logical AND. This may be the case because the tools can determine that a(x) and d(x) are unconditionally pure, and that b(x) and c(x) are definitely not impure (in which case the whole expression would be impure), but a next stage of the optimizer's work needs to have a closer look at b(x) and c(x) to determine what further optimization characteristics can be determined. It may be the case that a(x) and d(x) are in a catalog 212. Or a(x) and d(x) may be trivial with respect to optimization characteristics, e.g., they may lack divisions, local variables, and I/O calls, whereas b(x) and c(x) are not in the catalog and not trivial.

In many cases, a purity characteristic is the logical AND of the purity of dependent artifacts (e.g., child nodes). For example: IsPure(x+y)=IsPure(x) AND IsPure(y) when purity is defined in terms of side effects, access to non-local variables, use of static local variables, use of by-reference parameters, or the use of I/O streams or I/O devices.

More generally, in some embodiments path expressions describe a traversal in a graph 410 beginning from a current node. Left/Right is merely a way to navigate from a binary node. A more general form is an encoding of a path using indexes of edges 416. For example, f(a, b, c, d) may use a path denoted as Arguments[2] to navigate to the node representing c, where Arguments[1] indicates b, and Arguments[0] indicates a. As another example, a traversal path denoted as [3, 1, 0] in a graph which represents f(a, b, c+d*e, g) may refer to d; in this example, child 3 of the function is c+d*e (01, 1:a, 2:b, etc.), child 1 of the node c+d*e is d*e, and child 0 of the node d*e is d.

In some embodiments, inference 1210 or traversal paths may be even more complex to represent branching during optimization efforts. For example, consider the code represented as f(x) ? g(x): h(x), in which familiar C syntax is used; this could also be represented as "if f(x) then g(x) else h(x)". If f is a pure function but x is unknown, the tools 206, 424 cannot evaluate f(x) at compile time. A tool may also find out that g(x) is pure, but h(x) is not. It is not until runtime that f(x) will have a definitive value of true or false and the purity of the whole expression can be known. However, it may be that this whole expression occurs in a larger expression and when that larger expression is inlined, the tool can evaluate f(x) and end up with either g(x) or h(x) and decide on purity. Thus, an annotation 404 may use other Boolean algebra such as =>implication to formulate logic propositions that express a conditional purity as an optimization characteristic 402.

More about Callbacks and Partial Evaluation

In some embodiments, callbacks implement a contract between (a) the syntax graph walker 412 and analyzer 420, and (b) an optimization provider 424. The first translator 206 walk through a syntax graph 410 may be relatively general. For example, the translator may walk a syntax tree in a depth-first manner, determine semantic information for a node 414 (e.g. a node with a constant value forty-two is constant, never throws and exception, etc.), and then combine 1358, 1210 nodes as it goes back up the tree, again using a semantic provider that knows how to combine annotations. As used herein, "semantic provider" refers to optimization annotation semantics functionality described herein, which may be embodied in a graph annotator 406, a subgraph structure recognizer 420, an optimizer 424, a catalog 212, or any combination thereof.

For instance, consider a subtree representing code which may be represented as "1+2". In this case, nodes representing 1 and 2 are pure, thus the + can combine two instances of pure into a root instance of pure for the 1+2 subtree (or in some implementations, equivalently, for the + node at the subtree root).

The callback 1342 comes into use when the optimizer 424 is implemented to effectively instruct other translation software that if the other software encounters a node that is pure (but whose parent is not), then that node and status should be given to the optimizer so that the optimizer can perform an optimization on it.

For example, consider "f(1+2)". If f is not pure, the optimizer sets in place instruction to give the optimizer access later to the f(1+2) node, with a callback conveying information that child 1 of that node (the child node representing 1+2 in the invocation off with that argument) is pure. The optimizer can then perform 1346 partial evaluation 1348 of 1+2, and tell a rewriter 426 that the value has become 3, so the rewriter can change 1338 the tree to f(3).

As another example, consider the following exception handling code:

```
try
{
   f(x)
}
catch (FooException)
{
   // foo it
}
catch (BarException)
{
   // bar it
}
```

If an analyzer 206 or 424 comes to the conclusion that f(x) may throw Bar but can't throw Foo, and the optimizer 424 has requested a callback when nodes with deterministic exception behavior are found, such a callback 1342 can be made 1340 to say in effect that "child 0 of this try statement can throw {BarException, QuxException}". The optimizer 424 can then request removal of the handler 910 for FooException, because FooException can never happen.

Also note that this analyzer can create an annotation 404 for the entire try statement to have a set of possible exceptions 828 that corresponds to PossibleExceptions("f(x)") \ {BarException} U PossibleExceptions("// bar it"). This is another example of combining 1358 annotation values, in this case using set theory. In this description, the "U" denotes the set theory union operator, and the "\" denotes set difference. In the context of another try . . . catch . . . statement shown below, the set of possible exceptions that may get thrown from a try statement is Possible Exceptions (try_body) \ {E1, E2} U PossibleExceptions(catch_body1) U PossibleExceptions(catch_body2). Here is the corresponding try . . . catch . . . statement:

```
try
{
   try_body
}
catch (E1 e)
{
   catch_body1
}
catch (E2 e)
{
   catch_body2
}
```

The catch clauses take away E1 and E2 (hence the use of as set difference), but the bodies of these catch blocks may throw more exceptions that need to be union'ed in.

In some embodiments, an optimizer 424 can inject itself to run at runtime rather than only at compile-time. For example, consider the code "GetBigSet( ).Contains(x)" which checks whether an item x is a member of a large set of items. The exact meaning of "large" can depend on the particular system 102 involved, but some of the available measures may be, e.g., that the set be too large to fit completely in the available RAM, or that the set be so large that iterating through even half of its members would take so long with the available computing power that a human user would consider the program unresponsive.

Here an analyzer 206 or 424 may conclude that GetBigSet( ) is pure and hence it can be represented as a constant containing a big set (as the name implies). But it may unknown whether this code "GetBigSetQ.Contains(x)" will ever run, so memory 112 allocated to hold the constant would be wasted. A special case occurs when x is constant, allowing the optimizer 424 (at least in theory) to evaluate the code at compile time into true or false. Assume that x is not constant. Then either the tools leave the code as it is, which may result in a lot of CPU time if the code is run many times, or the tools reduce the GetBigSet( ) call to a big set constant.

An alternative in this example is for the optimizer to attempt reduction to a big set constant, conclude that the result would use more memory than desired (based, e.g., on admin settings or a configuration file or heuristics), and defer applying the optimization until runtime by rewriting the tree as "Memoize(( )=>GetBigSet( )).Contains(x)", where Memoize is an optimizer-provided function to perform memoization. This memoization function may inside of it hide caching behavior, frequency analysis, etc., to implement a policy to release the big set's memory if it isn't used sufficiently often, based on runtime dynamic behavior. In effect, this inserts 1340 a callback to the optimizer to run the optimizer at program 204 runtime.

In the code representation "Memoize(( )=> GetBigSet( )).Contains(x)", the "( )" and "=>" indicate presence of a lambda expression. This particular notation is lambda expression syntax from C #. In it, ( ) is an empty parameter list and =>is the token to denote a lambda. As such, it provides a way to write down a callback that takes no arguments. Similar notation in some other programming languages is:

C #: ( )=>foo-or-delegate ( ) {return foo;}
VB: Function ( ) foo
JavaScript: function ( ) {return foo;}
C++: [ ]( ){return foo;}

The ability of an optimizer 424 to inject itself to run at runtime rather than only at compile-time provides technical benefits. In the example above, a traditional optimizer has to decide whether to move the evaluation of GetBigSet( ) to some shared location, or leave it in the original spot. An enhanced optimizer as taught herein is not compelled to choose between those two extremes. Also, in environments with long running code, updates to the catalogs 212 used by the optimizer could affect the running code, long after a compile-time optimization pass has been carried out. For example, a whole piece of code may be deemed to run infrequently (maybe because of prior invocations of such code, which have fed statistics into a catalog), so the optimizer can decide to run itself at target code runtime by lifting that code into some lambda. It wouldn't necessarily be a Memoize(( )=>code) operation, but could instead resemble an Eval(( )=>code) operation, since the code purity has not necessarily been assessed. The optimizer may install itself via callback to run at a later time, which may also be a time when the catalog contains more information or otherwise updated information. Memoize operations may be considered a special case of invoking an optimizer at runtime using compile-time optimizer knowledge of code purity, with a CPU/memory trade-off. A more general case is invoking the optimizer at runtime, possibly with hints from knowledge inferred at compile time.

More about Optimization Prioritization

As discussed elsewhere herein, optimization candidates 1370 may be prioritized 1336 based on their relative weights 1334. A prioritizing weight function could be based on evaluation of a pure (sub)expression at compile time, measuring various items such as CPU cycles used, memory allocations made (and in some implementations the number of garbage collections triggered), and total size of the resulting constant in memory. These values can be put in annotations 404 such that they can be utilized by subsequent optimizer passes.

In some embodiments, other weights are based on the static shape of the code 408 or properties of the code 408. For example, the number of child nodes 414 can be a reflection of code complexity, as may the presence of a loop in code (loops may be CPU intensive), or the presence of a call to a "new" operator in C++ code or a constructor or another expression to allocate memory.

This highlights a flexibility of the teachings presented herein. While various programming languages may have annotations for purity or constantness (e.g., "constexpr" in C++) or exception behavior (e.g., "throws" in Java), they lack other characteristic indications, such as annotations 404 indicating that code 408 "allocates", "may allocate", or "never allocates".

Specific definitions and uses of optimization candidate weights 1334 may vary between implementations. One may involves thresholds set by a user, e.g., an embodiment may evaluate 1348 if doing so won't use more than x bytes of memory 112, or evaluate 1348 it if evaluation will take less than x seconds at compile time, regardless of memory usage. In some, a policy engine is plugged in. In some, machine learning is used, e.g., an optimizer 424 may place 1340 a learning callback 1342 in the emitted code to reinforce or guide optimization decisions and to make future decisions align better with observed behavior.

More about Annotation Combinations

Embodiments may use walkers 412 over a graph or tree representation 410 of code 214 to interrogate a semantic provider and to obtain annotations 404 of a wide variety. The algebra of these annotations may be provided by the semantic provider and may provide ways to combine 1358, 1210 annotations (e.g., logical AND denoted here as "&", union, etc.). Callbacks 1342 registered by an optimizer can be used to make optimization decisions, e.g. "if it allocates, then evaluate it at compile-time, or contribute 1212 another annotation to the node to convey that it may throw OutOfMemoryException". By evaluating pieces of code at compile time to constant values, subsequent optimizations may become possible, the result of which require less allocations at runtime. A trivial case illustrating this benefit is: "new Person("Bart", 21).Age", which after optimization bypasses allocation of a string and a Person at runtime and merely obtains the Age property which is a constant 21.

With regard to an algebra of annotations provided by a semantic provider 212, 406, 420, or 424, including ways to combine 1358, 1210 annotations, in some embodiments a semantic provider acts as an aggregation function, in the sense that when the semantic provider is given the annotations 404 of N child nodes 414 and a reference to a parent node 414, it returns a set of annotations for that parent node.

For example, consider the code subtree represented by "x/f(y)", where "/" denotes division. In this example, a syntax walker 206 (including a graph traverser 412) first analyzes "x", and asks a semantic provider (including a subgraph structure recognizer 420 and an annotator 406) for annotations, giving the semantic provider a reference to the node representing "x" and an empty set of annotations (empty because "x" has no children). The semantic provider may return a set of annotations such as {IsPure(true)}.

Next, the syntax walker analyzes "y", and asks the semantic provider for annotations 404, giving it a reference to "y" and an empty set of annotations because "y" has no children. The semantic provider may return a set of annotations such as {IsPure(true)}.

Next, the syntax walker analyzes "f(y)", and asks the semantic provider for annotations, giving it a reference to "f(y)" and the set {IsPure(true)} of annotations for "y". The semantic provider may return a set of annotations such as {IsPure(true), PossibleExceptions(Foo), Range(1, 100)}. In this example, the annotation Range(1, 100) is a delimitation 506 indicating that the possible values for the range (as opposed to domain; "range" as in "function range") of function f are limited to the values from 1 to 100.

Next, the syntax walker analyzes "x/f(y)", asks the semantic provider for annotations, giving it a reference to "x/f(y)" and the sets {IsPure(true)} (for the left side) and {IsPure(true), PossibleExceptions(Foo), Range(1, 100)} (for the right side). The semantic provider may return a set of annotations like {IsPure(true), PossibleExceptions(Foo)}. In this step, note that the semantic provider used the annotation Range(1, 100) obtained for the right operand of the/division and used it to not add DivideByZeroException to the set of possible exceptions 828 for the node representing the division. By contrast, if the range had included zero, or if no range were returned for the child node and hence zero was not excluded, then DivideByZeroException would be unioned in to the set of possible exceptions.

More About Catalogs

One relatively simple catalog 212 is a catalog for opaque library functions 708 that an optimizer cannot inspect by looking into them. For example, the routine Math.Sin is known to be pure and never throws, but is implemented as a CPU instruction that an optimizer doesn't necessarily understand. A pure function could also be implemented as a complex algorithm written in another language such as C or Fortran which the optimizer is not equipped to parse, or source code for a routine may not be available to analyze the routine for purity. In some embodiments, a catalog 212 maps the name "Math.Sin" 706, 604 or a hash 712, 604 thereof to its purity annotations 404, effectively providing optimization knowledge for leaf nodes in syntax graphs 410. In this example, this catalog is static and is provided by a developer ahead of compilation time.

Some embodiments use or provide a more advanced catalog 212, which identifies user-defined functions 710. An optimization characteristic 402 analysis of such a function's code happens once, and the result 602 is stored. The key 604 in the catalog may again be the function name 706, but the catalog entry 602 may also contain more information, such as a version number, or a module in which the function 710 is defined, or even a hash 714 of the code in the function. A hash 714 may be used to help ensure that mutation of the code 408 of the function invalidates the association 1214 of annotations with the code, since the association may no longer be valid after the code is changed. Adding 1356 to this catalog may be triggered explicitly, e.g., in a "define function" operation, or catalog updates 1356 may be done lazily upon encountering the first use of the function in a bigger piece of code, or updates 1356 may be done in an offline processing fashion, e.g., by a nightly job or a background process.

IN some embodiments, an even more advanced catalog 212 has some keys 604 that do not refer to named ("nonymous" as opposed to "anonymous") functions but instead represent some hash 716 or 720 of a syntax (sub)tree. For example, suppose a code fragment 214 being analyzed contains a subexpression of the form "a+b*c−d" where a, b, c, and d are some trees themselves. An embodiment may create 1356 a catalog entry 602 that stores annotations 404 for this whole piece of code and is indexed 604 by a hash 712 of "a+b*c−d".

Implementation details may vary. For example, one of skill may select an entry 602 size which balances storage requirements against expected (or measured) frequency of use. When an entry is too specific and hence infrequently used, and also relatively large, it may be a waste of storage. Even relatively small entries 602 may be wasteful if too specific, e.g., an entry stating that 3.1415 is a constant, or 2*PI is a constant, or Math.Sin(30)/2 is a constant.

It may also happen that a big tree is reused often but always varies a tiny bit in some part. For example, a tax calculation computation may be a complex formula that occurs often inline in a bigger expression (as opposed to being named as a helper function) and is always the same modulo some constant (e.g., a tax bracket, or some percentage). To accommodate such situations, one may hoist constants and pure nodes out of the expression and hash the result. For example, "f(x)*0.2−g(x)" and "f(x)*0.3−g(x)" can be turned into "f(x)*c−g(x)" for different values of constant c. As such, c is a kind of hole in the expression, and "f(x)*c−g(x)" may be represented accordingly as a subgraph structure template 718. A hash 720 of this rewritten expression can be used as the key 604 in the catalog 2121 to track semantic information of "f(x)*c−g(x)" for any value of c.

In some situations, if a tree gets generalized using this technique of creating a template, more unknowns are introduced. For example: f(x)/2 may be turned into f(x)/c for any value c. However, if c turns out to be 0, the properties of the resulting code are different from cases where c is not 0. This is reminiscent of the "conditional annotations" that were discussed earlier in the present disclosure. This is an example where the set of exceptions is dependent on the value of c. Where the earlier discussion has an example of conditional purity, this annotation may be something like [ThrowsExceptionIf(typeof(DivideByZeroException), c==0)] whereby a condition gets encoded in an annotation. As an additional observation, in some situations such conditional annotations may tend to cascade. Assume there is an exception conditional on an input, and the whole expression is part of a bigger try . . . catch . . . statement. Then the exceptions of the statement are also becoming conditional (and often with more complex predicates to describe these conditions). This may lead to a cut-off point where generalization of code using the templating technique is limited such that the complexity of these conditionals in annotations is not unbounded.

As a side note, if the template represented "f(x)/c−g(x)" then the annotations 404 may have conditionals, due to the division which is dependent on the value of c, with regards to the possibility of a division by zero exception.

A syntax walker can compute a template hash 720 as it traverses 1202 a tree 410 in a bottom-up fashion, drilling holes in a representation of the tree to perform a match modulo constants (or other trivialities) and thereby improve the match 1326 likelihood. More sophisticated data structures could be used to optimize this hash calculation and improve efficiency of a search of entries 602 in a catalog. For example, a catalog entry for "f(x)" could remember that there is a related entry for "f(x)*c", so the syntax walker knows that if the parent of the node "f(x)" is a multiplication, it should look in the catalog again to find a match for the parent. In this case, the catalog is effectively an optimized reverse index.

In short, the catalog 212 could be static (one-time definition of all entries 602) or dynamic (more or altered entries as more code 214 is analyzed). Also, a match 1326 with an entry 602 may be exact (e.g., by matching names or full hashes) or a match 1326 may be fuzzy (e.g., a match on partial hashes). So the space of catalog embodiments and their uses is quite big.

More About Origins and Context

An early view of some teachings herein involved constant folding with effect annotations. By way of context, some compilers include optimization steps that perform constant folding in order to reduce execution time of the generated code, by evaluating parts of the program at compile time. These optimizations often are based on built-in knowledge of primitive types and knowledge of which operations are safe to optimize. Library functions are often unknown to a compiler and thus not subject to such optimizations. Some teachings provided herein describe a rich semantic provider mechanism that provides information to a compiler to perform more thorough optimizations. As a side note, one of skill will recognize that a statement to the effect that software "knows" (or does not know) some data or some capability means that the software is (or is not) equipped or designed or configured suitably to process the data or to perform computation which provides the capability. Likewise, saying that software "understands" (or does not understand) an item means that the software is (or is not) equipped or designed or configured suitably to computationally process the item.

Some compilers have a rich set of primitive types they have deep semantic understanding about, and thus provide optimizations for. An example is the C # compiler which knows about the "+" concatenation operator on strings and optimizations that are safe to perform. The C # semantics of "+" align with the runtime behavior of a "Concat" function and the language and the runtime are kept in sync.

As another example, consider regular expressions. With the beneficial application of teachings provided herein, many such small languages can be supported by merely marking library functions with semantic information. For example: "String.Format("{0} is {1}", person.Name, person.Age);" may be pure, yet the compiler doesn't have to understand the format string that is passed to Format. In this particular example, the Format is not necessarily pure because it has a hidden parameter on the user's machine's culture, used to print, e.g., decimals with the desired decimal separator, or dates with the desired format. However other overloads of Format are pure because they use an invariant culture. Given that annotations can be provided on individual methods, some embodiments do not suffer from extreme special-casing in compiler code to educate the compiler about variations of library functions. Another example is "new Regex("[0-9]*").Match(42)". A catalog may contain information about Regex and Match being pure functions, and then the optimizations come automatically.

Some compilers have deep built-in knowledge of the individual libraries 702 or frameworks of libraries 702 they're targeting during compilation, and contain optimizations tailored to these libraries. For example, some C++ compilers understand "printf" and the mini-language embedded in printf arguments (e.g., % d placeholders), allowing those compilers to do some optimizing computation of formatted strings at compile time. This is a place where a runtime library's semantics has leaked into a compiler.

Some compilers rely on language extensions to perform or guide more aggressive optimizations. Examples include macro languages for compile-time expansion of code and the introduction of "constexpr" in C++. This approach does not allow existing libraries to be annotated with semantic knowledge (without source-level editing) and also lacks other kinds of annotation 404 that can be used by optimizers 424, e.g., guarantees about exception behavior. To introduce these in a manner akin to C++ "constexpr", the language would need a plethora of additional keywords 1352. By contrast, some teachings presented herein provide extensible semantic annotations 404 that can guide optimizations without relying 1350 on new keywords.

In some embodiments, abstract syntax trees 410 describing a program are scanned bottom-up to discover information about the code entities 408 referred to by various nodes 414. As an example, consider nodes that perform invocations of methods. When such a node is encountered, a semantic provider is consulted to answer questions such as whether a method is a pure function (e.g., one like Math.Sin), whether a method can throw an exception (e.g., BigInteger's division operator), and so on. This semantic information 402 is stitched 1358 together to find the largest spanning subtrees that share certain optimization characteristics 402.

For example, assume that Math.Sin and Math.Cos are pure in each of the ways denoted herein using reference numerals 806 (no side effects), 810 (no external variable access), 814 (no static local), 822 (no I/O), and 826 (can't throw exceptions). Given that assumption, applying these functions to a stable value (e.g., a variable that's passed by value) will also be pure in those senses and as indicated by reference numeral 818 (no by-reference parameter). In addition, Math.Pow can be discovered to be pure in the same sense, so an expression such as "Math.Pow(Math.Sin(x), 2)+Math.Pow(Math.Cos(x), 2)" can be deemed to be entirely pure. Using a trigonometric identity (sine squared plus cosine squared equals one) then allows an optimizer 424 to reduce the whole expression to a constant of value one.

As a side note, one of skill recognizes that despite this application of a mathematical trigonometric identity, mathematics and computing are not the same. In mathematics, there is no concept of an overflow exception. But in this discussion of computing, reasoning about the size of function results and assumptions about the size of int or float storage and how values 504 are represented in that storage 112 underlie the assumption that no overflow exception will be thrown.

Building on this Math.Sin and Math.Cos example, one mechanism of a solution 206, 1200 taught here involves (a) discovering 1206, 1210 semantic properties 402 associated with nodes, given the semantic properties discovered 1206, 1208, 1210 for their children, and (b) invoking 1216 optimization providers 424 when certain predicates over these semantic properties are evaluated to be true. In a purity analysis, a corresponding optimization provider may be one that requests a callback 1342 when a node is deemed to be pure, so it can trigger partial evaluation 1348, thus reducing the node to a constant. These optimization providers 424 can be invoked during the first (bottom-up) pass or during a second (top-down) pass through the syntax tree 410 after all semantic properties have been evaluated, thus allowing for discovering 1358 maximum portions of trees 410 where certain properties 402 hold.

Furthermore, some optimization providers 424 can return a new rewritten 1338 tree 410 to the optimization analysis driver 420 or 406, which can apply 1336 a weight function 1334 to decide (locally) which optimization provider 424 provides the biggest or most desired gains. These cost functions 1334 are pluggable in some embodiments, and can leverage all the semantic information discovered when scanning 1204 the tree (or in a newly rewritten 1338 tree, post-optimization). For example, one cost provider 1334 can take into account the number of constants (the more, the better, because there's less to evaluate), while another cost provider 1334 could assess costs by evaluating the original tree and comparing the cost to evaluating the new tree, while yet another one could perform algebraic operations based on criteria such as estimated costs reported for nodes (such as number of CPU cycles, memory cost, I/O behavior, etc.).

In some embodiments, discovery of semantic information 402, 404 takes place via a provider which can be backed by a catalog 212. In one implementation, an internally used catalog was built for a large subset of the functions in the Microsoft.NET™ framework (mark of Microsoft Corporation). Information in a catalog 212 can be partially supplied from existing metadata annotations (e.g., host protection attributes, purity annotations) or can be manually provided.

As discussed herein, some embodiments provide or use an extensible annotation mechanism to denote optimization opportunities on code entities 408 such as functions, members, data types, and so on. Annotations 404 to denote behaviors related to side-effects, functional purity, and so on, are associated 1214 with code entities in order to help an optimizer 424 determine whether candidate optimizations can be safely performed. Some optimizers 424 adhere to a plug-in architecture, and some may be discovered through annotations and then participate in an optimization stage of a compiler pipeline.

In some embodiments, annotation capabilities taught herein are layered on top of existing languages and runtimes, rather than changing languages or runtimes. This distinguishes these embodiments from approaches like the addition of constexpr to C++ or approaches whereby a programming language itself gains a notion of pure functions versus functions with side-effects, e.g., Haskell with IO monads. Many tools and techniques taught herein are applicable to existing languages and runtimes, e.g., to optimize a back-end of a service. Thus, a cloud service which evaluates many expressions can be improved by applying optimizations even when the underlying language (e.g., C #) or runtime (e.g., Microsoft Common Language Runtime) or libraries (e.g., Microsoft .NET libraries) do not provide deep semantic information that can be leveraged to perform such optimizations.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

CONCLUSION

In short, the teachings provided herein may be applied to locate and document optimization opportunities, and thereby enhance code translation 1302 by compilers 122 or interpreters 122. In some embodiments, an enhanced translator 122, 206 scans 1204 a program 204 syntax graph 410, recognizes 1208 subgraph structures 418, and annotates 1212 nodes 414 of the graph 410 to document optimization characteristics 402 of program code entities 408 that are associated 1214 with the nodes 414. Subgraph structures 418 and corresponding annotations 404 may be maintained 1356 in an optimization catalog 212, which is distinct from any particular optimizable program 204. Optimizers 424 improve program code 214 translation 208 based on the annotated syntax graph 410.

In some embodiments, optimization characteristics 402 may specify 1308 code purity in terms of possible execution value 504 (including value ranges 506) and potential execution behaviors 508, e.g., side-effects 808, local static variable 816 usage or global variable 812 usage, I/O usage 824, usage of by-reference parameters 820, which exceptions 828 are possible during program execution, and non-termination 832 of code.

In some embodiments, subgraph structures 418 may be identified 604 using routine 704 names 706, hash values 712, and templates 718 with holes that any constant will fill.

In some embodiments, parent node 414 optimization characteristics 402 may be inferred 1210 from characteristics 402 of child nodes 414.

In some embodiments, optimization candidates 1370 may be prioritized 1336 using weight functions 1334.

In some embodiments, optimizer 424 callbacks 1342 may be inserted 1340 in a graph 410 or code 408 to evaluate 1348 optimization characteristics 402 incrementally.

Embodiments are understood to also include or benefit from tested and appropriate security controls and privacy controls such as the General Data Protection Regulation (GDPR), e.g., it is understood that appropriate measures should be taken to help prevent misuse of code translation such as injection of malware during translation and help avoid tampering with any personal or private information the translation may process during program execution. Use of the tools and techniques taught herein is compatible with use of such controls.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 12 and 13 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A code translation optimization system, comprising:
a memory;
a processor in operable communication with the memory, the processor configured to perform steps which include (a) traversing at least a portion of a syntax graph of a program, (b) recognizing a predetermined subgraph structure in the syntax graph, (c) annotating the recognized syntax subgraph structure with an optimization characteristic annotation, the optimization characteristic annotation indicating a presence or an absence of functional purity of a piece of code that corresponds to the recognized subgraph structure, and (d) performing an optimization of a code translation of the program based at least in part on a result of the annotating step; and
wherein the memory comprises a catalog having an entry, the entry including an identification of the subgraph structure and the optimization characteristic annotation which is associated with the identified subgraph structure, the catalog entry in existence prior to the code translation of the program and also in existence after the optimization of the code translation of the program is performed.

2. The system of claim 1, wherein the identification of the subgraph structure includes or is indexed by at least one of the following keys:
a name of a routine of a library which is utilized by the program;

a name of a user-defined routine which is part of the program and is specific to the program;
a hash value of a routine;
a hash value of the subgraph structure; or
a hash value of a syntax subgraph structure template.

3. The system of claim 1, wherein the optimization characteristic annotation indicates at least one of the following:
   whether the piece of code that corresponds to the recognized subgraph structure accesses any non-local variable during an execution of the piece of code;
   whether the piece of code that corresponds to the recognized subgraph structure has any local static variable;
   whether the piece of code that corresponds to the recognized subgraph structure has any parameter which is passed by reference to support an execution of the piece of code;
   whether the piece of code that corresponds to the recognized subgraph structure accesses any I/O device or I/O stream during an execution of the piece of code;
   whether the piece of code fails to terminate after an execution of the piece of code has begun; or
   whether the piece of code that corresponds to the recognized subgraph structure may throw an exception during an execution of the piece of code.

4. The system of claim 1, comprising a pluggable optimizer which the system is configured to invoke to perform the optimization, wherein an optimizer is deemed pluggable when the optimizer can be enabled or disabled or both without recompiling code which invokes the optimizer.

5. The system of claim 1, wherein the optimization characteristic annotation indicates whether the piece of code that corresponds to the recognized subgraph structure has no side-effect during an execution of the piece of code.

6. A method for finding optimization opportunities during code translation, the method comprising:
   scanning at least part of a syntax graph of a program, the syntax graph having nodes, the syntax graph representing at least syntactic structure aspects of the program;
   ascertaining that a piece of code of the program which is associated with a node of the syntax graph has an optimization characteristic;
   annotating the syntax graph with an optimization characteristic annotation according to the ascertained optimization characteristic, the optimization characteristic annotation including an execution value of the piece of code which is discernable prior to execution of the piece of code or specifying an extent of functional purity of the piece of code, or both; and
   consulting a catalog which associates the optimization characteristic with an identification of the corresponding portion of the syntax graph of the program, the catalog being distinct from the program and being in existence prior to the scanning of the program syntax graph and also being in existence after the code translation of the program is performed.

7. The method of claim 6, wherein ascertaining that the piece of code of the program which is associated with the node of the syntax graph has the optimization characteristic comprises at least one of the following:
   matching the piece of code to an entry in the catalog which describes the optimization characteristic;
   matching a syntax subgraph containing the node to an entry in the catalog which describes the optimization characteristic.

8. The method of claim 6, wherein ascertaining that the piece of code of the program which is associated with a first node of the syntax graph has a first optimization characteristic comprises making an inference from a second optimization characteristic that is associated with a second node of the syntax graph, the first and second nodes having different respective locations in the syntax graph, the first and second optimization characteristics having the same or different respective values.

9. The method of claim 6, further comprising providing an optimizer access to the annotated syntax graph, and the optimizer producing at least one of the following:
   an optimization which reduces a processor cycle count for an execution of the piece of code of the program;
   an optimization which reduces a memory requirement for an execution of the piece of code of the program;
   an optimization which reduces an I/O requirement for an execution of the piece of code of the program;
   an optimization which at compile time replaces a part of the program by a constant value;
   an optimization which memoizes data or instructions or both in the piece of code of the program; or
   an optimization which removes a call or jump to an exception handler in the piece of code of the program.

10. The method of claim 6, further comprising an optimizer producing an optimization based on the annotated syntax graph, wherein the optimization includes a rewrite of at least a portion of the syntax graph.

11. The method of claim 6, further comprising:
    an optimizer producing multiple optimization candidates which are based on the annotated syntax graph;
    assigning respective weights to at least two of the optimization candidates; and
    prioritizing optimization candidates based at least in part on their respective assigned weights.

12. The method of claim 6, further comprising inserting a callback which upon execution triggers a partial evaluation which produces an optimization based at least in part on the annotated syntax graph.

13. The method of claim 6, wherein the ascertaining does not rely on use of a programming language keyword in a source code of the program specifically to denote the optimization characteristic.

14. The method of claim 6, further comprising updating the catalog to include an additional piece of code or an additional syntax subgraph structure, and updating the catalog to include a corresponding optimization characteristic which matches an additional annotation of the syntax graph.

15. The method of claim 6, further comprising updating the catalog by at least one of the following: modifying an entry in the catalog, deleting an entry from the catalog, or changing the order of entries in the catalog.

16. A computer-readable storage medium configured with data and instructions which upon execution by a processor perform a method for finding optimization opportunities during code translation, the method comprising:
    scanning at least part of a syntax graph of a program, the syntax graph having nodes, the syntax graph representing at least syntactic structure aspects of the program;
    ascertaining that a piece of code of the program which is associated with a node of the syntax graph has an optimization characteristic;
    annotating the syntax graph with an optimization characteristic annotation according to the ascertained optimization characteristic, the optimization characteristic annotation specifying an extent of functional purity of the piece of code;
    consulting a catalog which associates the optimization characteristic with an identification of the corresponding portion of the syntax graph of the program, the catalog being distinct from the program and being in existence prior to the scanning of the program syntax graph and also being in existence after the code translation of the program is performed; and producing an optimization of the program based at least in part on the annotated syntax graph.

17. The storage medium of claim 16, wherein the method further comprises forming or locating an optimization characteristic subtree, namely, a set of nodes that have identical or inference-relatable respective optimization characteristics and that also collectively define a subtree of the syntax graph which consists of the nodes and a connection between nodes in the set.

18. The storage medium of claim 16, wherein the method further comprises annotating the syntax graph with a possible values annotation which delimits all possible execution values for a piece of code which can assume different values during different executions of the program, and employing the possible values annotation while producing the optimization of the program.

19. The storage medium of claim 16, wherein the method further comprises at least one of the following:

enhancing a source code of the program by adding to the source code a textual representation of a syntax graph optimization characteristic annotation; or saving a representation of a syntax graph optimization characteristic annotation in a file which is derived from and associated specifically with the program for use in a subsequent code translation of a version of the program.

20. The storage medium of claim 16, wherein ascertaining that a code F of the program which is associated with the node of the syntax graph has the optimization characteristic comprises ascertaining that the code F is purely functional code, in that for a given input set, executing the code F always provides the same execution result when control passes from the code F to other code.

* * * * *